United States Patent [19]

Bannai et al.

[11] Patent Number: 5,267,052
[45] Date of Patent: Nov. 30, 1993

[54] ENCODING THE ORIGINAL IMAGE DATA AND PROGESSIVELY ENCODING THE IMAGE DATA INDEPENDENTLY

[75] Inventors: Yuuichi Bannai, Koganei; Tadashi Yoshida, Ichikawa; Yasuji Hirabayashi, Kawasaki; Hidefumi Oosawa, Kawaguchi, all of Japan

[73] Assignee: Canon Kabushiki Kaisha, Tokyo, Japan

[21] Appl. No.: 673,411

[22] Filed: Mar. 22, 1991

[30] Foreign Application Priority Data

Mar. 24, 1990 [JP] Japan .................................. 2-074201
May 31, 1990 [JP] Japan .................................. 2-143728

[51] Int. Cl.⁵ .............................................. H04N 1/40
[52] U.S. Cl. ...................................... 358/444; 358/426
[58] Field of Search ............... 358/467, 444, 447, 443, 358/448, 403, 401, 425, 445, 426, 262.1, 446

[56] References Cited

U.S. PATENT DOCUMENTS

| 4,261,018 | 4/1981 | Knowlton | 358/470 |
|---|---|---|---|
| 4,317,136 | 2/1982 | Keyt et al. | 358/438 |
| 4,814,894 | 3/1989 | Yoshida | 358/298 |
| 4,823,193 | 4/1989 | Takahashi | 358/257 |
| 4,849,816 | 7/1989 | Yoshida | 358/434 |
| 5,033,859 | 7/1991 | Yamamoto | 358/442 |
| 5,050,230 | 9/1991 | Jones et al. | 358/262.1 |
| 5,086,487 | 2/1992 | Katayama et al. | 358/426 |
| 5,124,811 | 6/1992 | Ohsawa et al. | 358/426 |

OTHER PUBLICATIONS

IEEE Trans. Comm., vol. COM-29, No. 6, Jun. 1981, pp. 858-867, "Compression of Black-White Images with Arithmetic Coding," Langdon et al.

*Primary Examiner*—Stephen Brinich
*Attorney, Agent, or Firm*—Fitzpatrick, Cella, Harper & Scinto

[57] ABSTRACT

An image processing method and apparatus encodes input image data, and performs processing using encoded image data. The method and apparatus can progressively encode input images, store and transmit the encoded images, and display a plurality of low-resolution images on one picture surface.

37 Claims, 26 Drawing Sheets

FIG. 3 (1)
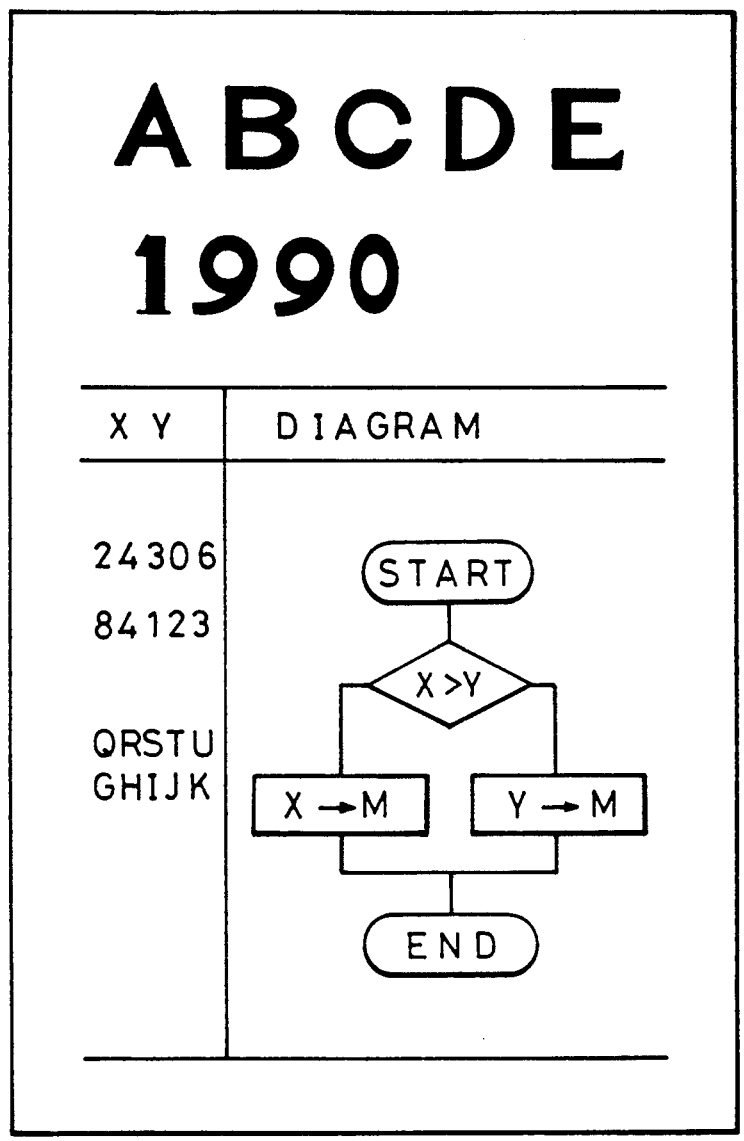
FIG. 3 (2)
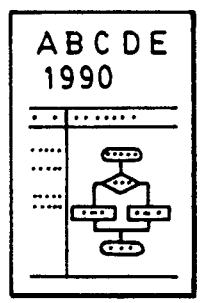

REDUCED IMAGE

| C | B |
|---|---|
| A | X |

NONREDUCED IMAGE

| a | b | c |
|---|---|---|
| d | e | f |
| g | h | i |

ENCODING THE ORIGINAL IMAGE DATA AND PROGESSIVELY ENCODING THE IMAGE DATA INDEPENDENTLY

BACKGROUND OF THE INVENTION

1. Field of the Invention

This invention relates to an image processing method and apparatus which encodes image data and performs processing using the encoded image data.

2. Description of the Related Art

Heretofore, in an image communication terminal having an external storage unit having a relatively large capacity, received image data have been stored in the external storage unit together with additional information represented by character codes, such as the name of an image, the date and the like. The stored data have been read from the external storage unit whenever necessary, and the read data have been displayed on the picture surface of a display unit, or output using a printer. If a large number of received image data are present, a summary of additional information, such as the names of images and the like, of the received image data has been output on the display unit or on paper to confirm the received image data.

In the above-described prior art, however, in order to grasp the entire contents of the received large number of images, only the summary of additional information represented by character codes can be utilized, and it has been impossible to confirm the images using image information. Hence, in order to confirm the contents of the images, it has been necessary to output desired image data every time on the display unit or on paper, which can take a long time.

It has been proposed in U.S. patent application Ser. No. 07/355,116, assigned in common with the present application, to use a technique wherein a reduced image of an original image is stored as an index image, and a desired original image is selected from among a plurality of index images.

In the above-described technique, however, there is room for improvement in the efficiency of image storage since the amount of data to be stored is still large.

As for encoding of image data, in a facsimile apparatus which is a typical example of a conventional still-picture communication apparatus, a method has been adopted wherein an image is sequentially scanned in the direction of the raster, encoded and transmitted. In this method, in order to grasp the entire contents of the image, it is necessary to transmit encoded data of the entire image. Hence, a long transmission time is needed, and it has been difficult to adapt the method to image communication services, such as an image data base service, videotex and the like.

In order to promptly grasp the entire contents of an image, progressive encoding has been considered. FIG. 30 shows an example of conventional progressive encoding.

In FIG. 30, frame memories 501-504 store images reduced to 1, ½, ¼ and ⅛ in size, respectively. Reduction units 505-507 provide images reduced to ½, ¼ and ⅛, respectively. Encoders 508-511 encode images reduced to ⅛, ¼ and ½ and 1, respectively.

The reduction unit 505 reduces an image from the frame memory 501 by, for example, a method to subsample the image to ½ in both the main scanning and subscanning directions to provide a ½-sized image, and stores the reduced image in the frame memory 502. The ½-sized image is further reduced by the reduction unit 506 to provide a ¼-sized image, and the reduced image is stored in the frame memory 503. Similarly, a ¼-sized low-resolution image is provided by the reduction unit 507, and the reduced image is stored in the frame memory 504.

By sequentially encoding and transmitting the stored images from lower-resolution images, rough entire images can be promptly grasped. In the FIG. 30 example, an image is reduced to ½, ¼ and ⅛ in both the main scanning and subscanning directions, encoding is performed in the order of ⅛, ¼, ½ and 1 (an original-sized image), and transmission is performed also in this latter order. In encoding the ⅛ image, the ⅛ image stored in the frame memory 504 is sequentially scanned, and a target picture element to be encoded is referred to surrounding picture elements by the encoder 508 to perform entropy coding, such as arithmetic encoding or the like. As for the ¼ image, the encoder 509 performs encoding by referring picture elements surrounding the target picture element from the frame memory 503 to picture elements surrounding the ⅛ image from the frame memory 504. The encoding efficiency is thereby increased. Similarly, the encoders 510 and 511 perform encoding by referring the ½ image stored in the frame memory 502 and the original-sized image stored in the frame memory 501 to the ¼ image stored in the frame memory 503 and the ½ image stored in the frame memory 502, respectively.

In such a progressive encoding method, in order to maintain information of low-resolution images, various reduction methods are used. For example, a method wherein, after passing through a low-pass filter, an image is again subjected to binary coding, and subsampling is performed, a method to prevent the disappearance of a specific image by providing exception processing in filter operation, and other methods have been considered.

As described above, in the progressive encoding method, by sequentially encoding and transmitting reduced images from lower-resolution images, it is possible to promptly transmit the entire image.

In this method, however, in order to maintain image information of low-resolution images, reduction is repeated several times. Since the order of encoding and transmitting images is the reverse of the order of reduction processing, images of all stages including an original image must be stored in memories. As a result, this method has the disadvantages that the size of the apparatus becomes large and processing becomes complicated.

Furthermore, the progressive encoding method is not suitable for a method to sequentially encode and transmit an image, for example in a facsimile, for the following reasons.

In facsimile communication, since paper is usually used as a recording medium, low-resolution images in intermediate stages are unnecessary in any event. Moreover, since an inexpensive and polular terminals are most often used, progressive encoding which requires frame memories is unsuitable for facsimile communication.

When progressive encoding is applied to an image data base or the like, it is possible to consider adopting the lowest-resolution image as an icon to be used for data base retrieval. In this case, images other than an original image are sequentially decoded to be mainly used only as intermediate media for obtaining the original image. Hence, this approach has the disadvantages that unnecessary images must be stored in the data base, and a long time is needed for a decoding operation.

A technique has been disclosed in U.S. Pat. No. 4,823,193 wherein a part of the images stored in memories is recorded at the transmission side together with information of the communication partner.

In this technique, however, it is impossible to confirm whether or not the information stored in the memories has the content that the operator actually wants to transmit.

That is, for example, when an original comprising plural sheets is read by an autofeeder and stored in memories, a case may arise wherein the feeder feeds two or more sheets at once, and information in which part of the original to be transmitted is lacking is stored within the memories.

In such a case, it has been impossible to recognize which sheet of the original is lacking in a simple manner.

Furthermore, at the reception side, if a large amount of data has been received, a long time is needed for normally reproducing all received images, and also a large amount of paper is needed.

Particularly when only part of the received data is needed, there is the possibility that time and recording paper are wasted.

SUMMARY OF THE INVENTION

The present invention has been made in consideration of the above-described problems.

It is an object of the present invention to enable the efficient monitoring of a plurality of images.

This object is accomplished, according to one aspect of the present invention, by an image processing method comprising the steps of progressively encoding input image data to provide encoded image data including a plurality of low-resolution image data, storing the plurality of low-resolution image data among the encoded image data, and forming a plurality of low-resolution images on one picture surface according to the stored plurality of image data.

According to another aspect, the present invention relates to an image processing apparatus comprising input means for inputting image data, encoding means for progressively encoding the image data to provide encoded data having respective resolutions, memory means for storing the encoded image data in accordance with the resolution of the encoded image data, and image forming means for forming a plurality of images corresponding to encoded image data having common resolution stored in the memory means on one picture surface.

It is a further object of the present invention to provide an efficient encoding method.

This object is accomplished, according to still another aspect of the present invention, by an image processing method comprising the steps of reducing an original image a plurality of times to output reduced images, and encoding the original image and the reduced images.

It is a still further object of the present invention to provide an image filing apparatus having an excellent operability.

It is still another object of the present invention to efficiently transmit image information.

It is still a further object of the present invention to provide an image processing apparatus which reduces memory capacity and simplifies its configuration.

It is still another object of the present invention to omit unnecessary intermediate-stage images in progressive encoding, and to realize a prompt grasp of the entire image.

It is still another object of the present invention to provide a system which is suitable for sequential encoding of an image, such as image encoding in a facsimile or the like, and which eases communication control of a facsimile, and the like, by transmitting icon images obtained by reducing original images whenever necessary.

These and other objects and features of the present invention will become more apparent from the following description taken in connection with the accompanying drawings and the description of the appended claims.

BRIEF DESCRIPTION OF THE DRAWINGS

FIG. 3(1) illustrates an original image and FIG. 3(2) illustrates a reduced image corresponding thereto;

FIGS. 16(1) and 16(2) illustrate reference picture elements in exception processing;

DETAILED DESCRIPTION OF THE PREFERRED EMBODIMENTS

Figure 1:
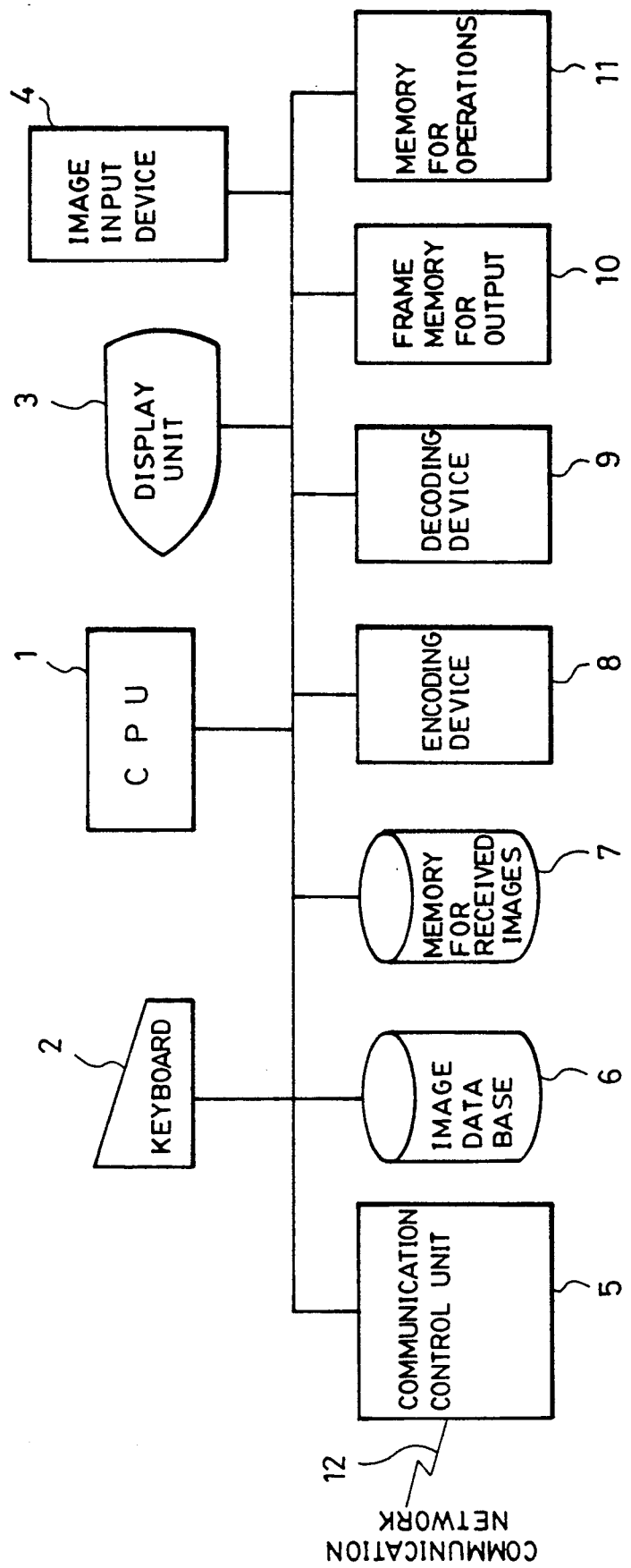
FIG. 1 shows an image communication apparatus according to an embodiment of the present invention.

FIG. 1 illustrates the configuration of an image communication terminal according to an embodiment of the present invention. In FIG. 1, a central processing unit (CPU) 1 controls the operation of the entire image communication terminal. A keyboard 2 inputs various kinds of operation commands and character code data to the CPU 1. A display unit 3 displays images and characters. An image input device 4 photoelectrically reads an image of an original and inputs read data. A communication control unit 5 controls transmission/reception. Image data base 6 stores image data in the form of files. A memory 7 for received images stores received image data in the form of files. An encoding device 8 encodes image data. A decoding device 9 decodes the encoded image data. A frame memory 10 for output holds data to be displayed on the display unit 3. A memory 11 for operations temporarily holds received image data and uses the data for various kinds of operations. Data are transferred between the image communication terminal and another terminal via communication network 12. The operation of the present embodiment having the above-described configuration will now be explained with reference to the drawings.

(1) Image Input

This is processing to read an image of an original by the image input device 4, and to store read data in the image data base 6.

Figure 2:
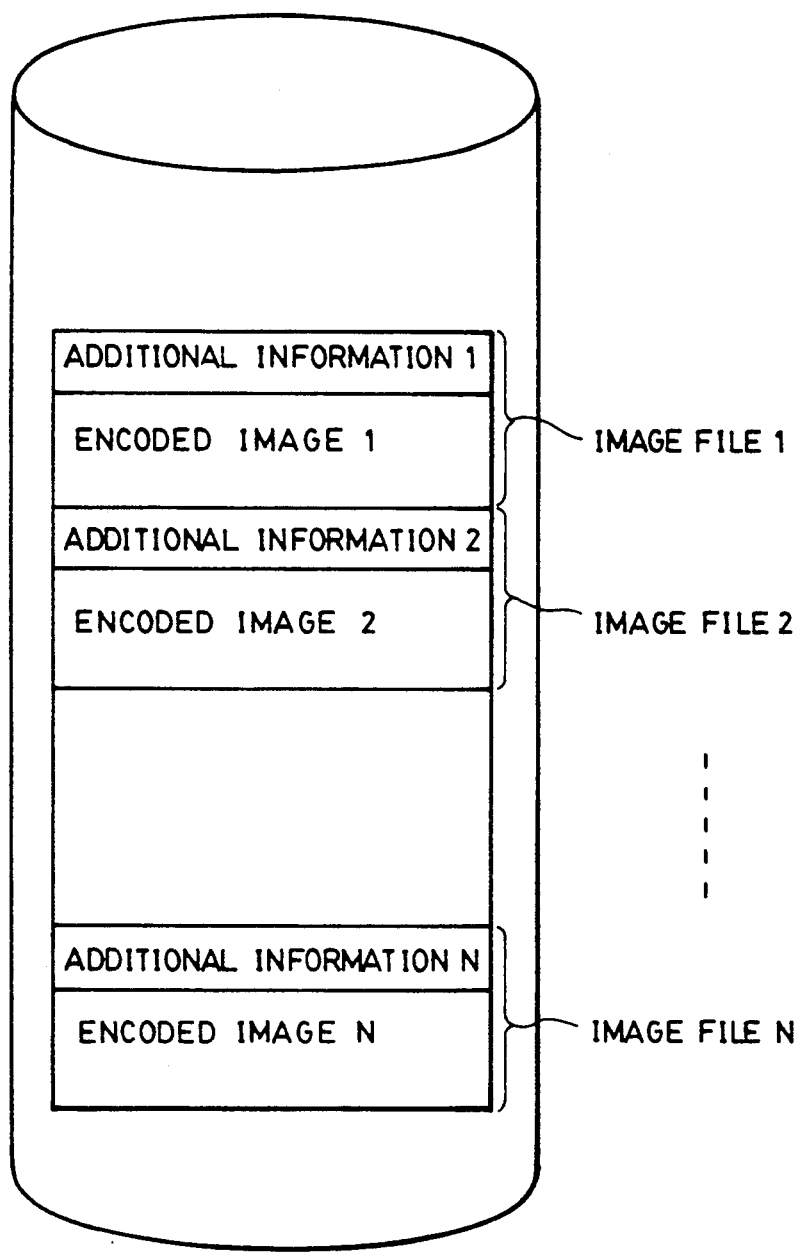
FIG. 2 illustrates an image data base and the form of a memory for received images.

First, the image data input from the image input device 4 are progressively encoded by the encoder 8, and are sequentially stored in the image data base as image files from lower-resolution data. At that time, additional information, such as the names of images and the like, input from the keyboard 2 is stored in the data base 6 together with the encoded images, as shown in FIG. 2.

(2) Image Output

This is processing to display a desired file among image files stored in the image data base 6 or the memory 7 for received images on the display unit 3.

The desired image file is retrieved based on the additional information, such as the names of images and the like, input from the keyboard 2, is read from the image data base 6 or the memory 7 for received images, is decoded by the decoding device 9 to be written in the frame memory 10 for output, and is displayed on the display unit 3.

(3) Reception

In accordance with a predetermined communication control procedure, the communication control unit 5 receives image data transmitted from another terminal via the communication network 12. The image data comprise a header portion including additional information of the images, and an encoded image portion subjected to progressive encoding. The image data are stored in the memory 11 for operations during reception, and are stored in the memory 7 for received images in the form shown in FIG. 2 after the completion of reception.

(4) Transmission

First, by assigning a desired image file using the keyboard 2, the desired image file is read from the image data base 6, and is stored in the memory 11 for operations. Subsequently, in accordance with a communication control procedure predetermined by the communication control unit 5, the image file is transmitted to another terminal via the communication network 12.

(5) Display of Summary of Received Images

This is a function to display a summary of received images in reduced images of transmitted images. FIG. 3(1) illustrates an original image, and FIG. 3(2) illustrates a reduced image corresponding to the original image shown in FIG. 3(1). In the reduced image shown in FIG. 3(2), fine characters cannot be discriminated, but it is possible to discriminate large captions, the outline of figures, and the like.

Figure 4:
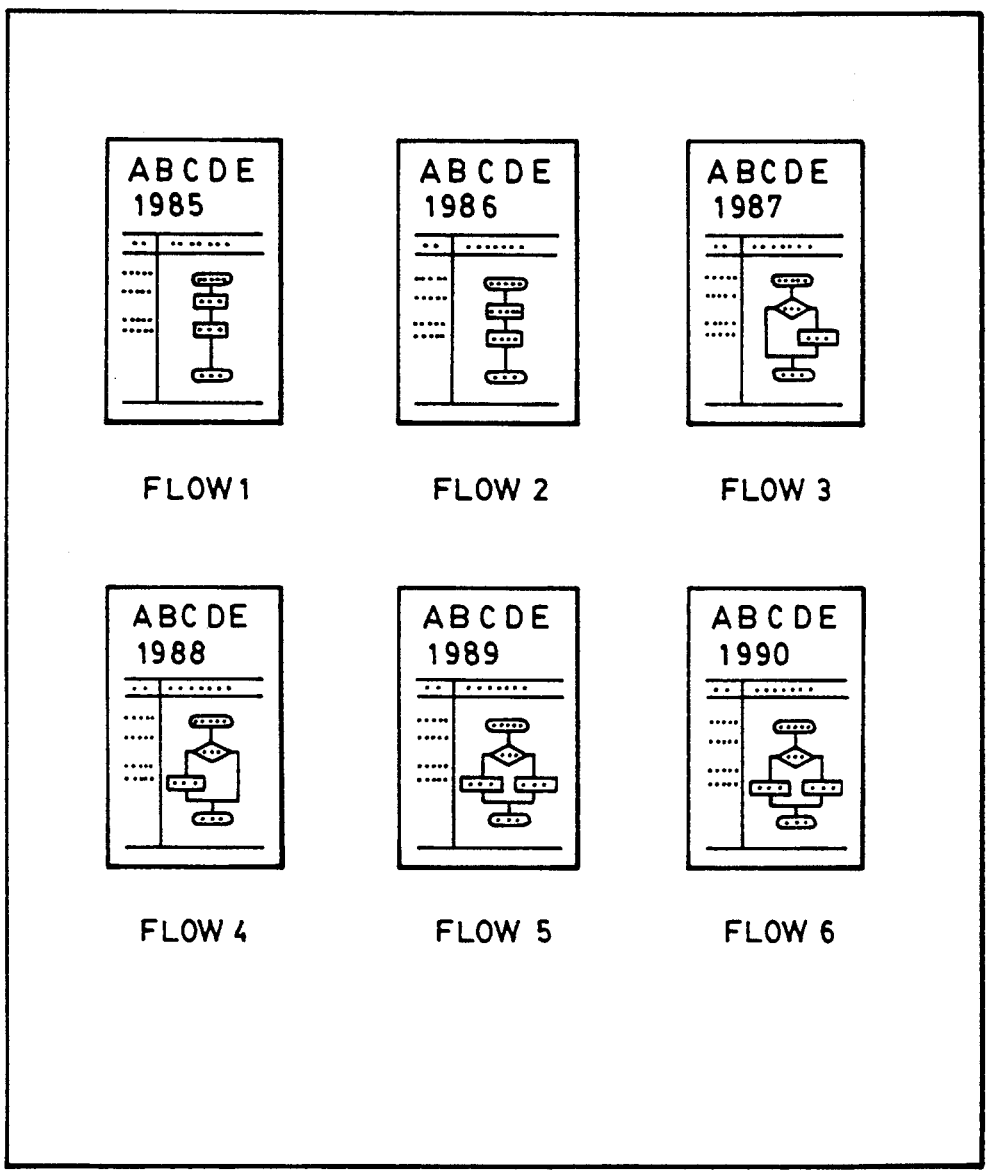
FIG. 4 shows a display example of an image-summary picture surface.

FIG. 4 is an example of an image-summary picture surface displayed on the display unit 3. In FIG. 4, corresponding names of images are displayed under reduced images. Accordingly, it is possible to simultaneously monitor the outline of a plurality of file images on such display. The processing will now be explained with reference FIG. 4.

First, encoded images are read for each image file stored in the memory 7 for received images. The read images are decoded by the decoding device 9, and image data having the lowest resolution are taken out by a method which will be described later. The low-resolution image data for a reduced image of an original image are stored in a predetermined position of the frame memory 10 for output together with the corresponding name of the image, and are displayed on the display unit 3, as shown in FIG. 4.

Figure 5:
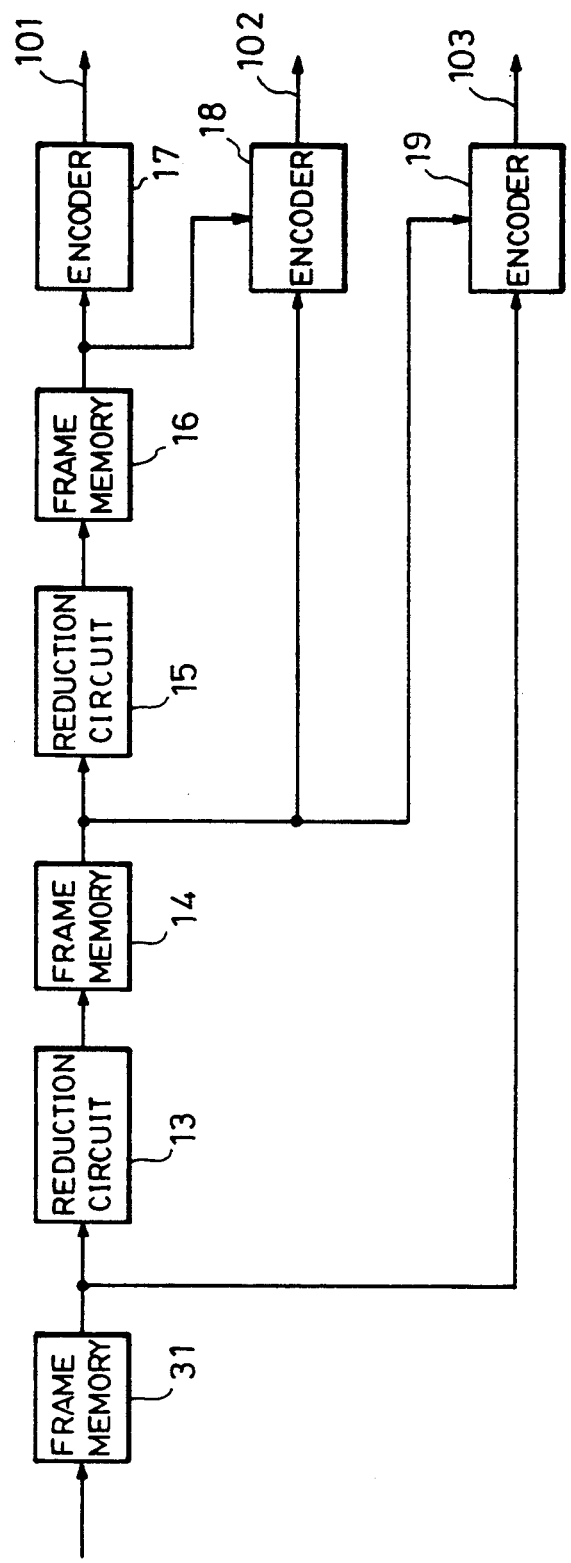
FIG. 5 is a block diagram of an encoding device.

FIG. 5 is a block diagram showing an example of the configuration of the encoding device 8.

In FIG. 5, there are shown frame memories 31, 14 and 16, reduction circuits 13 and 15, and encoders 17, 18 and 19. First, original-picture data to be progressively encoded output from the image input device 4 are stored in the frame memory 31. The original-picture data stored in the frame memory 31 are converted into data of an image reduced to $\frac{1}{2}$ in the vertical and horizontal directions by the reduction circuit 13, and the data of the reduced image are stored in the frame memory 14. The reduction method in this operation may, for example, be a method to perform subsampling to 1/n (n is 2 in this case) in both the vertical and horizontal directions, or a method to perform filtering using a low-pass filter, a high-pass filter, a recursive filter or the like, and to perform subsampling after performing threshold-value processing of the obtained value. The method is not limited to the above-described two methods.

Similarly, $\frac{1}{2}$-size image data stored in the frame memory 14 are converted into data of an image reduced to $\frac{1}{2}$ in the vertical and horizontal directions by the reduction circuit 15, and the data of the reduced image are stored in the frame memory 16. Accordingly, data of an image reduced to $\frac{1}{4}$ in the vertical and horizontal directions of the image stored in the frame memory 31 are stored in the frame memory 16.

The encoder 17 performs entropy encoding of the image data stored in the frame memory 16 using, for example, an arithmetic encoding method, and outputs first-stage encoded data 101. The encoder 18 performs entropy encoding of the image stored in the frame memory 14 while referring to the image stored in the frame memory 16, and outputs second-stage encoded data 102. Similarly, the encoder 19 performs entropy encoding of the image stored in the frame memory 31 while referring to the image stored in the frame memory 14, and outputs third-stage encoded data 103. The image data thus progressively encoded are sequentially recorded in the data base 6 from lower-resolution data.

Although entropy encoding has been illustrated as an encoding method, other encoding methods may also be used. Furthermore, it is possible not only to store progressively encoded image data in the data base, but also to transmit the data to another system via the communication network.

Figure 6:
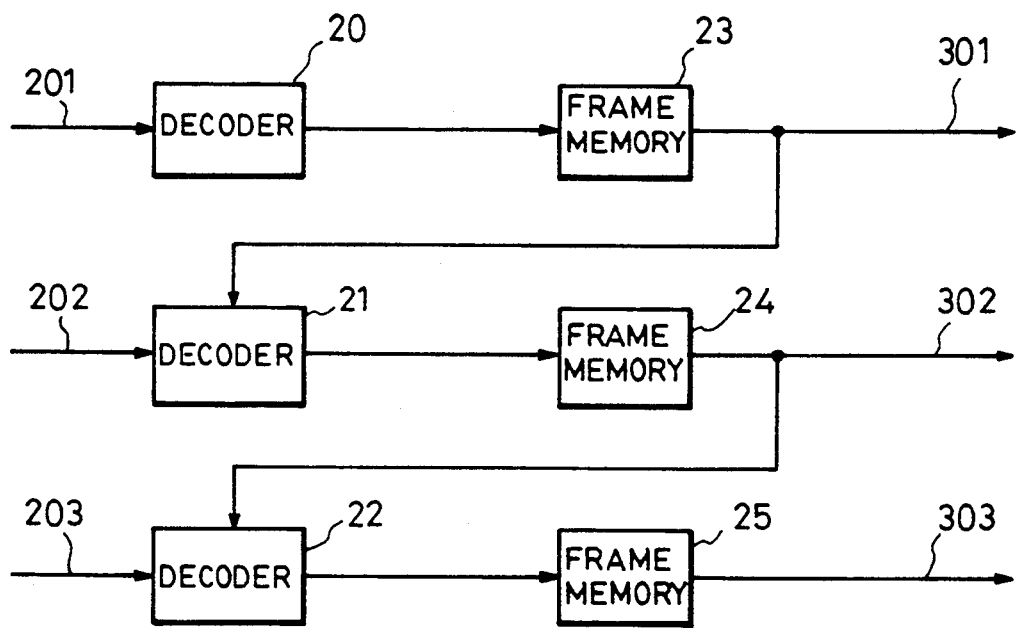
FIG. 6 is a block diagram of a decoding device.

FIG. 6 is a block diagram of the decoding device. In FIG. 6, there are shown decoders 20, 21 and 22, and frame memories 23, 24 and 25. First, the first-stage (low-resolution) encoded data 201 among encoded data (progressively encoded signals) stored in the data base 6 in a progressively-encoded state are input to the decoder 20, where the data 201 are decoded. The decoded data are stored in the frame memory 23, which outputs first-stage decoded image data 301. When providing a reduced image for displaying a summary as shown in FIG. 4, the decoding operation is terminated at this stage, and the image data 301 are written in a predetermined position of the frame memory 10 for output.

When providing the original image, the following processing is performed: Second-stage encoded data 202 among encoded data (progressively encoded signals) read from the image data base 6 or the memory 7 for received images are input to the decoder 21. The decoder 21 decodes the encoded data 202 while referring to the image data stored in the frame memory 23 at the above-described first-stage decoding operation. The decoded data are stored in the frame memory 24, which outputs second-stage decoded image data 302. Third-stage encoded data 203 among read encoded data (progressively encoded signals) are input to the decoder 22. The decoder 22 decodes the encoded data 203 while referring to image data stored in the frame memory 24. The decoded data are stored in the frame memory 25, which outputs third-stage decoded image data 303. At that time, the image data stored in the frame memory 25 represents the original image before being encoded.

Although, in the present embodiment, the first-stage image among progressively encoded images is used as the reduced image used in the display of the summary of received images, the reduced image to be displayed is not limited to the first-stage image, but an image of any other stage may also be used. Furthermore, while an explanation has been provided of the case of three-staged progressively encoded images, the number of stages in not limited to three, but any other number may also be adopted.

Figure 7:
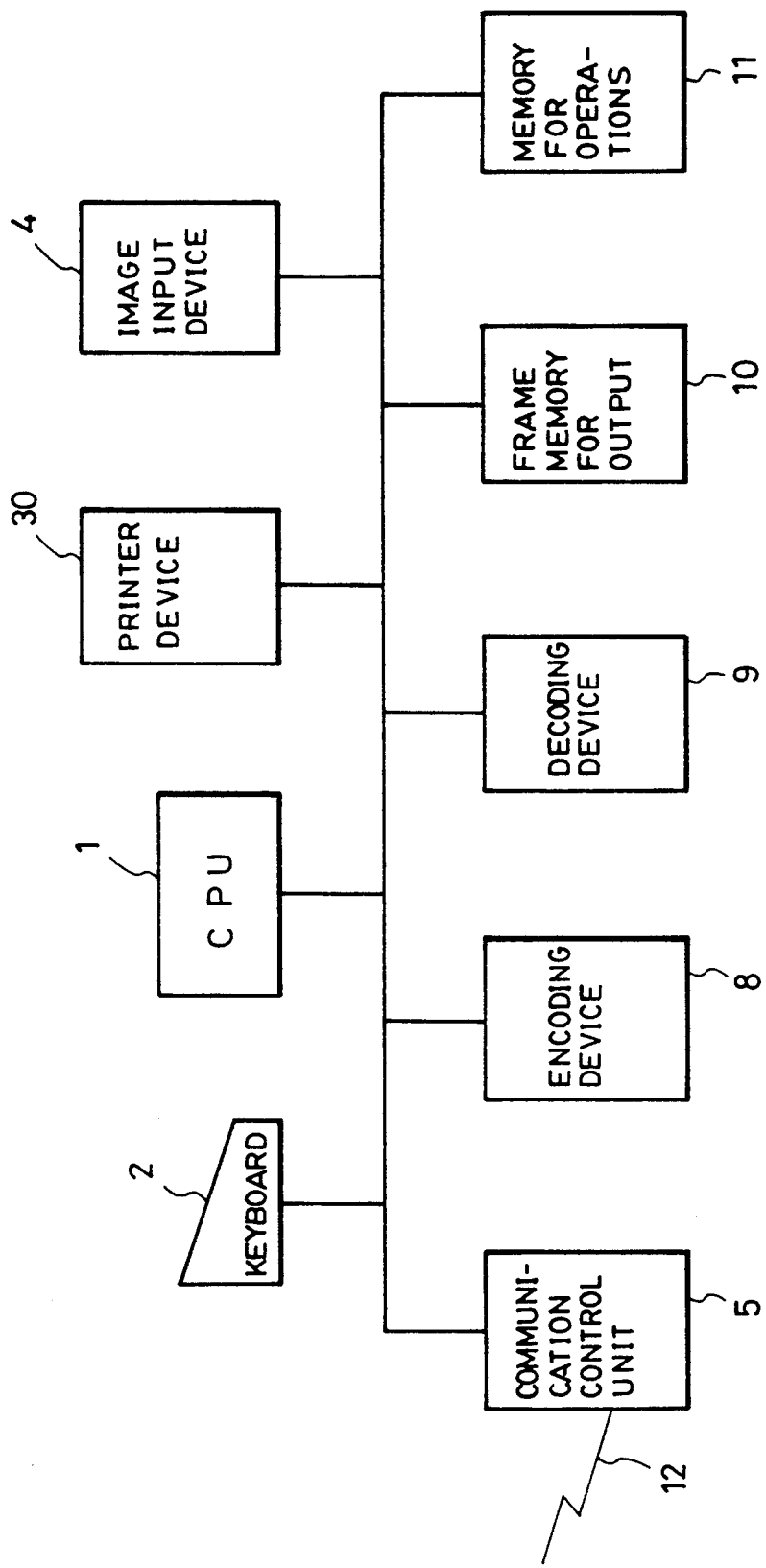
FIG. 7 shows an image communication apparatus according to another embodiment of the present invention.

Although, in the foregoing embodiment, an output is displayed on the display unit 3, an output may be printed on paper using a printer device. If a display unit is absent, and a storage unit does not have the capacity to hold a large number of image data, a configuration such as shown in FIG. 7 may be adopted.

That is, a printer device 30 is used in place of the display unit 3 shown in the FIG. 1 configuration illustrating the foregoing embodiment, and the image data base 6 and the memory 7 for received images are omitted. In such a configuration, when image data have been received from another terminal, only low-resolution image data among progressively encoded image data are held, and a decoded original image is output from the printer device 30.

After receiving a plurality of image data in the above-described manner, the output of a summary of received images is commanded. A summary of received images is then output from the printer device 30 in the form shown in FIG. 4 in accordance with held low-resolution image data. This operation will now be explained with reference to the drawings.

Figure 8:
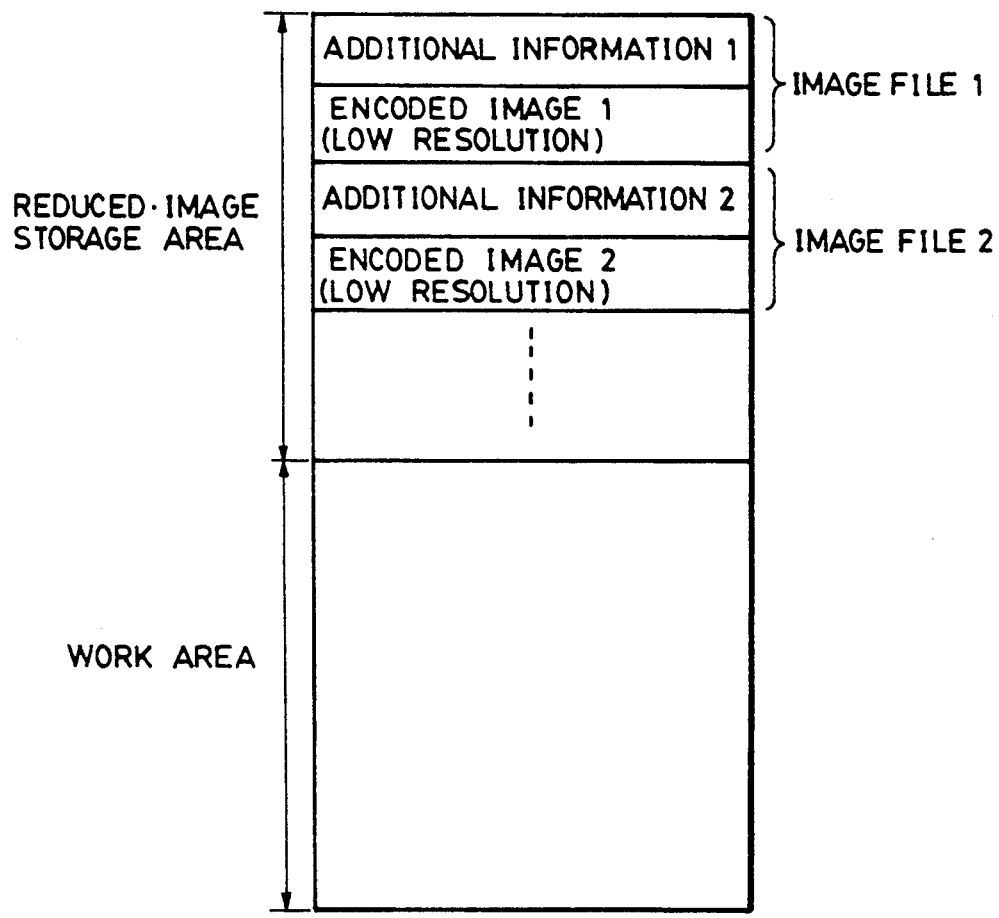
FIG. 8 is a detailed diagram of a memory 11 for operations.

In reception, received image data are stored in the memory 11 for operations as in the FIG. 1 embodiment. In the present embodiment, the memory 11 for operations is used as shown in FIG. 8 so that additional information relating to the plurality of images and low-resolution image data among progressively encoded image data are stored in a reduced-image storage area of the memory 11 for operations. The extraction of low-resolution image data from among encoded image data can be easily performed, since delimiters are present between progressively encoded data having different resolutions. Encoded image data of higher stages are transmitted to the decoding unit 9 to be decoded. The decoded data are transmitted to the frame memory 10 for output, and are output from the printer device 30.

When outputting the summary of received images, a plurality of encoded images (low-resolution images) held within the reduced-image storage area of the memory 11 for operations are transmitted to the decoding unit 9 to be decoded. The decoded image data are stored in predetermined positions of the frame memory 10 for output together with the names of images in the additional information as in the FIG. 1 embodiment, and are output on recording paper from the printer device 30 in the form as shown in FIG. 4. Finally, the reduced-image storage area of the memory 11 for operations is cleared to terminate the processing.

As explained above, by providing the function of decoding low-resolution image data among received progressively encoded image data, and displaying or outputting low-resolution images by reducing them, it is possible to easily confirm the outline of a large number of image data as image information on a picture surface or a sheet of paper, and to efficiently perform the control and retrieval of images.

Furthermore, it is possible to efficiently monitor a plurality of images using a storage unit having a small capacity.

Figure 9:
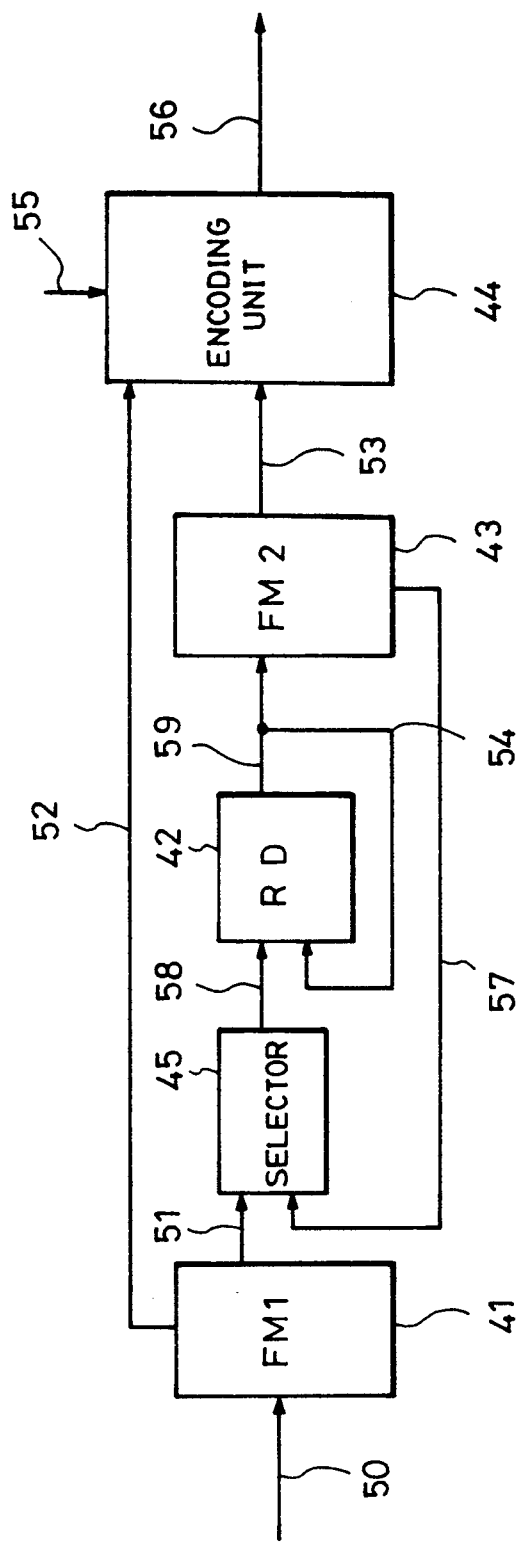
FIG. 9 is a block diagram showing the outline of an encoding device.

FIG. 9 illustrates a binary image encoding device to which the present invention is applied. In FIG. 9, a frame memory FM1 41 stores one picture frame of an original image. An image reducing unit 42 provides a reduced image. In the present embodiment, an image is reduced to ½ in both the vertical and horizontal directions. A frame memory FM2 43 stores the provided reduced image. An encoding unit 44 encodes the image reduced by the image reducing unit 42 and the original image using arithmetic encoding, and transmits encoded data.

First, an image signal input from an image inputting device (not shown) via line 50 is stored in the frame memory 41. An image signal is output from the frame memory 41 to line 51 for every raster. This signal is selected by a selector 45, and is input to the image reducing unit 42 via line 58. An image is reduced to ½ in the vertical and horizontal directions by the image reducing unit 42.

The selector 45 selects whether an original image is to be reduced, or a reduced image stored in the frame memory 43 is to be further reduced. If a reduced image (a ½ or ¼ image) has been selected by the selector 45, a reduced image signal is output from the frame memory 43 to line 57. The signal is selected by the selector 45, and is input to the reducing unit 42 via line 58.

Data for an image reduced to ½ in both the vertical and horizontal directions by the image reducing unit 42 are stored in the frame memory 43 via line 59. After storing the data of the image reduced to ½ of the original image in the frame memory 43 according to the foregoing process, an image signal of the image reduced to ½ is output from the frame memory 43 to line 57 for every raster, and the signal passes through the selector 45 to line 58. An image reduced to ¼ is provided by the same process as described above, and is stored in the frame memory 43. Subsequently, the image reduction to ½ in the vertical and horizontal directions is repeated in the same manner, such as a ⅛ image, a 1/16 image, etc., until a desired image size is finally obtained.

If it is assumed that the desired image size is ½$^n$, a finally obtained image reduced to ½$^n$ is temporarily stored in the frame memory 43 as an icon image or a communication control image. The icon image is then input to the encoding unit 44 via line 53 to be encoded, and encoded data are output to line 56. The encoded data become an icon indicating the outline of the original image to be subsequently encoded.

Subsequently, the data of the original image are transmitted from the frame memory 41 to the encoding unit 44 via line 52 to be encoded. In the present embodiment, since the icon image and the original image are sequentially encoded independently from each other, it is unnecessary to provide frame memories for a plurality of progressively encoded images at the side of the decoding unit. Furthermore, by decoding the icon image in the decoding unit, it is possible to promptly grasp a rough outline of the original image. If the original image is not needed after decoding the icon image, it is possible to stop the decoding or receiving operation at this stage.

Figure 10:
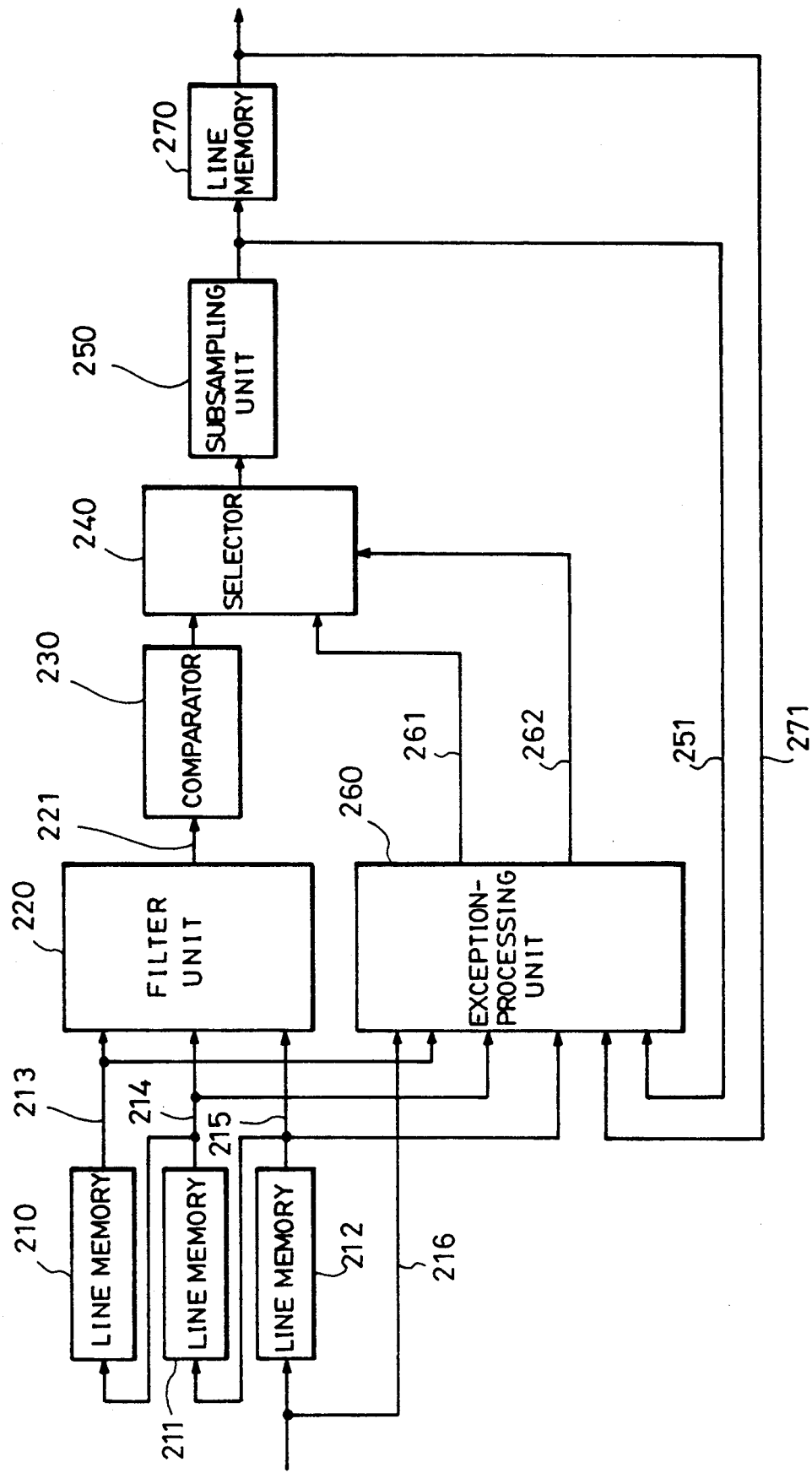
FIG. 10 is a block diagram of a reduction unit.

FIG. 10 shows a detail of the reducing unit 42. In FIG. 10, there are shown line memories 210, 211 and 212 for storing picture elements for one line. Outputs from the line memories 210, 211 and 212 are input to a filter unit 220 via lines 213, 214 and 215, respectively. The details of the filter unit 220 will now be explained.

Figures 11, 12:
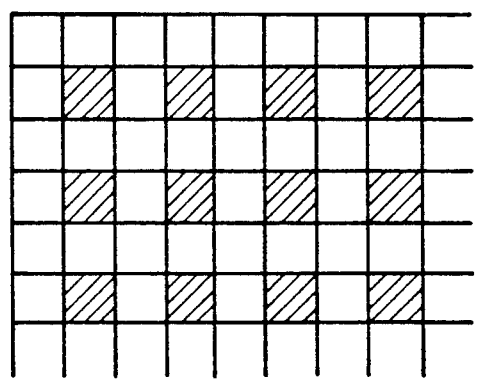
FIG. 11 is a diagram showing coefficients of a low-pass filter.
FIG. 12 is a diagram showing a subsampling method.

FIG. 11 shows the coefficients of a 3×3 filter used in the filter unit 220. In the present embodiment, a low-pass filter is used. A weighting coefficient for a picture element in the center is represented by C (C is 4 in a standard case), and weighting coefficients as shown in FIG. 11 are provided for surrounding picture elements. If the value of the density of the picture element in the center is represented by $D_{i,j}$ (i=1−M, j=1−N, where M and N are the sizes of the image in the horizontal and vertical directions, respectively), the output density W of the filter is expressed by:

$$W = (D_{i-1,j-1} + 2D_{i,j-1} + D_{i+1,j-1} + 2D_{i-1,j} + CD_{i,j} + 2D_{i+1,j} + D_{i-1,j+1} + 2D_{i,j+1} + D_{i+1,j+1}) \quad (1)$$

Output W 221 from the filter unit 220 is binary-coded with a threshold value T (in the present embodiment, T=8 in a standard case) by a comparator 230. Binary coding is performed so that:

$$\text{output signal} = 1 \text{ when } W \geq T \quad (2)$$
$$\text{output signal} = 0 \text{ when } W < T.$$

The binary coded output is selected by a selector 240, and is reduced to ½ in both the vertical and horizontal directions by a subsampling unit 250.

FIG. 12 illustrates a subsampling operation. By taking out picture-element data indicated by hatching for every other picture element in the main-scanning and subscanning directions, a subsampled image having a ½ size (¼ in area) is formed. This operation can be easily realized by latch timing of picture-element data. Output from the subsampling unit 250 is output to the frame memory 43 shown in FIG. 1 via a line memory 270.

Figure 13A:
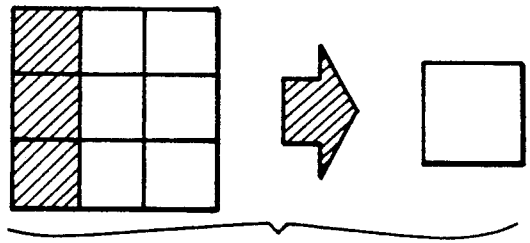
FIGS. 13(a)–13(c) illustrate how fine lines disappear by the low-pass filter.
Figure 13B:
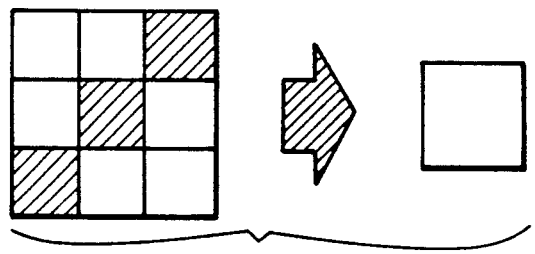
Figure 13C:
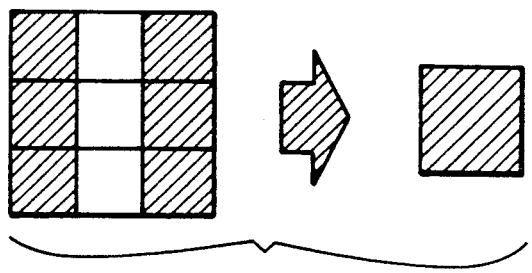

As described above, the density of surrounding picture elements is preserved by the low-pass filter (the coefficients shown in FIG. 11), and the size of the image is reduced to ½ by subsampling. However, a case may, for example, arise wherein a line having the width of one picture element disappears for a certain phase of the subsampled position. FIGS. 13(a)–13(c) illustrate an example of such case, and show results in a case wherein, after using a low-pass filter having values of c=4 and T=8 in expressions (1) and (2), the center of 3×3 picture elements is subsampled. FIG. 13(a) is a case in which a black vertical line does not pass through the center of the 3×3 picture elements. The result of subsampling becomes white, and the line disappears. Similarly, an oblique black line and a central white line disappear as shown in FIGS. 13(b) and 13(c), respectively. Accordingly, it is necessary to preserve information, such as a line or the like, irrespective of the sampling position.

Figure 14:
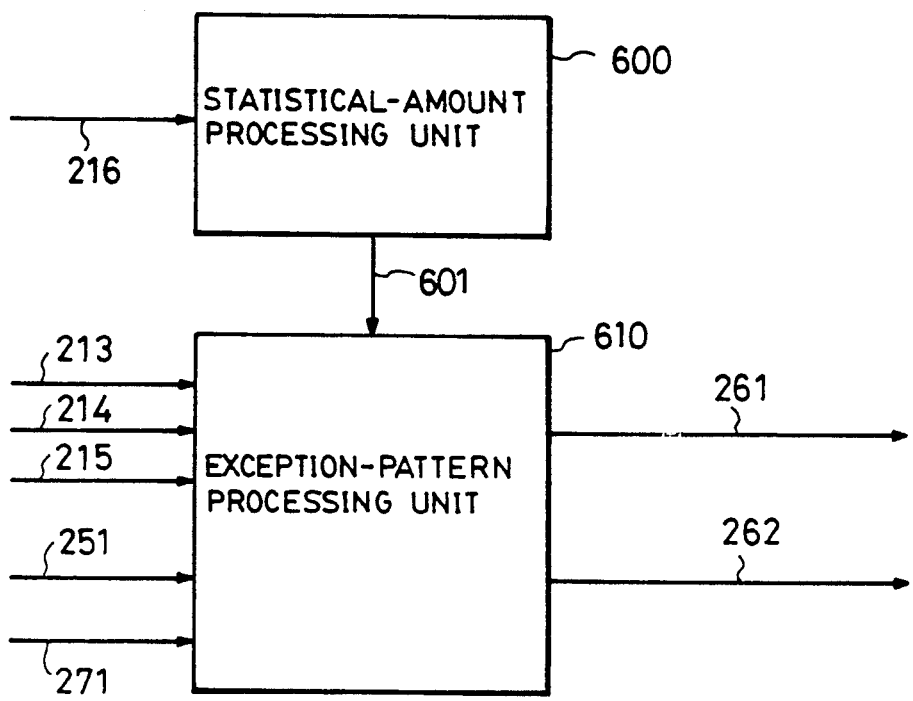
FIG. 14 is a block diagram of an exception processing unit.

By providing an exception-processing unit 260, as shown in FIG. 10, and by performing exception processing in addition to the reduction processing by filtering and subsampling, information, such as fine-line edges, isolated points and the like, is preserved. FIG. 14 shows the configuration of the exception-processing unit 260.

Figure 15:
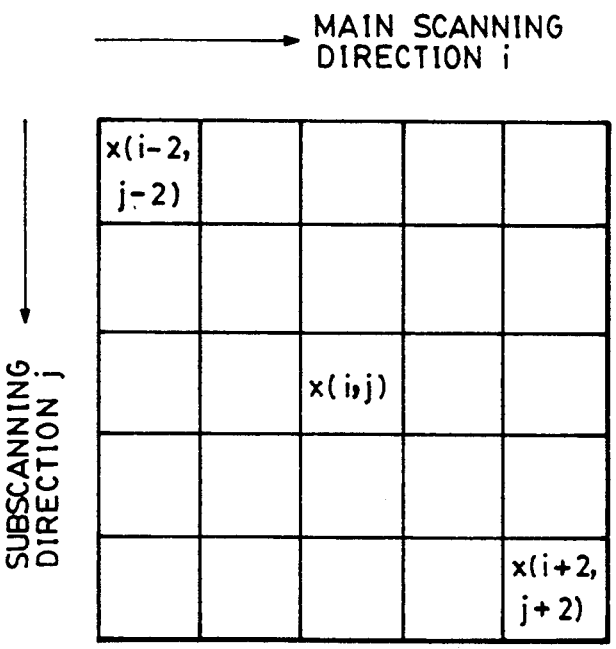
FIG. 15 illustrates a statistical processing method.

The exception-processing unit 260 comprises a statistical-amount processing unit 600 and an exception-pattern processing unit 610. Respective signal lines are the same as the lines having identical numbers shown in FIG. 10. The statistical-amount processing unit 600 checks the black-and-white distribution of picture elements surrounding a picture element to be reduced, outputs an exception-pattern selection signal 601 to the exception-pattern processing unit 610, and determines an exception pattern. FIG. 15 shows an example of the exception pattern, wherein the main scanning direction (the horizontal direction) is represented by i, the subscanning direction (the vertical direction) is represented by j, and the picture element to be reduced is x(i, j).

The picture element x(i, j) is situated at the same position as the central value ($D_{i,j}$ in expression (1) of the picture element to be subjected to filtering by the low-pass filter 3×3. In the present embodiment, the statistical amount (distribution) of surrounding 5×5 picture elements is calculated. According to the statistical amount, the property of the image, for example, whether the image is a character, line-drawing, or dither image, or a positive or negative image, is determined, and a proper exception pattern is selected. The determination of a positive or negative image is performed in the following way.

If the sum of the density of the 5×5 picture-element area is represented by S, S can be expressed by:

$$S = \sum_{j=-2}^{2} \sum_{i=-2}^{2} x(i,j),$$

where x(i, j)=0 or 1 (0 for a white picture element, and 1 for a black picture element). If S≧TN (=18), the image can be determined to be a negative image because black picture elements dominate.

A dither image or any other halftone image is determined in the following manner. That is, the 5×5 picture elements are divided into 5 stripes each having 5 picture elements in the vertical and horizontal directions, respectively, and the frequency of reversal between black and white in respective stripes is counted. If CN≧16, where CN is the sum of the count values, the image is determined to be a dither or halftone image since the frequency of reversal is large. The frequency of reversal between black and white can be easily counted by a counter.

The exception-pattern processing unit 610 refers 3×3 picture elements in a reduced image output from the line memories 210-212 with already-reduced 3 picture elements output from the subsampling unit 250 and the line memory 270. If the result of filtering is undesirable, the exception-pattern processing unit 610 outputs an exception-pattern signal 261 and an exception-pattern selection signal 262. The selector 240 can output an exception-pattern signal in place of a filter output.

FIGS. 16(1) and 16(2) show reference picture elements in the exception-pattern processing unit 610. FIG. 16(1) shows an image after reduction processing, and FIG. 16(2) shows an image before reduction processing. In FIG. 16(2), symbol e represents a target picture element of an image to be reduced, and symbols a, b, c, d, f, g, h and i represent surrounding reference picture elements which are the same as picture elements to be supplied to the filter unit 220. The picture elements abc, def and ghi are input from the line memories 210, 211 and 212 via lines 213, 214 and 215, respectively. In FIG. 16(1), symbol X is a picture element as a result of reduction, and symbols A, B and C are already reduced picture elements which are input via lines 251 and 271.

Figure 17A:
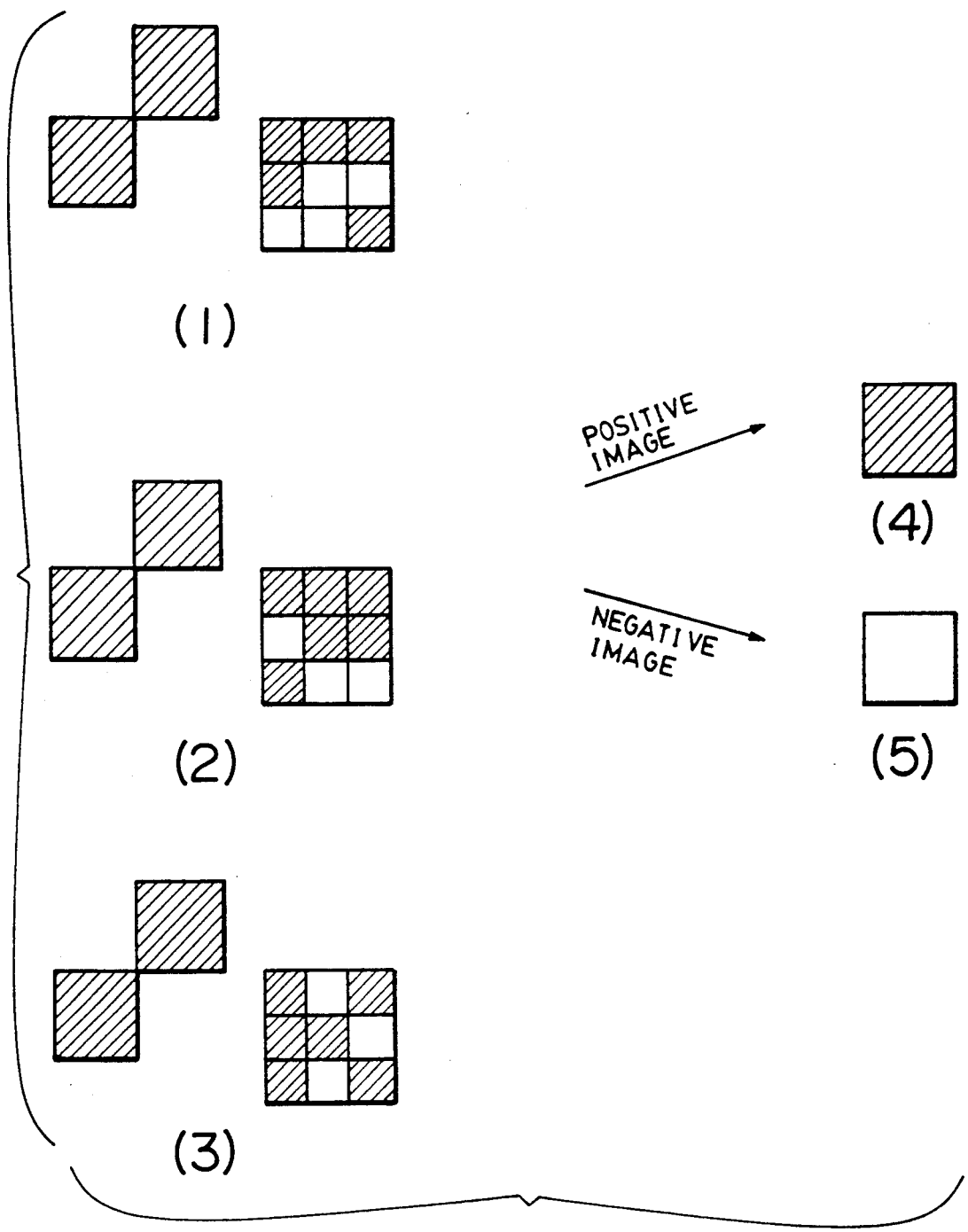
FIGS. 17(a) and 17(b) illustrate selection examples in exception processing according to statistical processing.
Figure 17B:
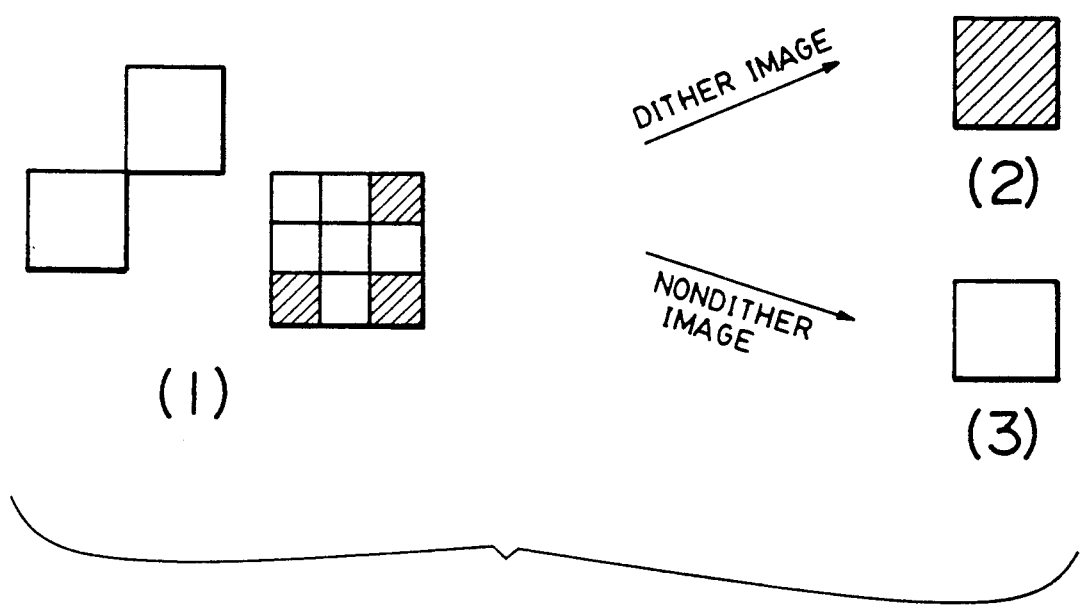

FIGS. 17(a) and 17(b) show examples of selection of exception patterns when the property of an image has been determined by the statistical-amount processing unit 600. Respective patterns in FIGS. 17(a) (1)-(3) are examples wherein it is preferred to provide different outputs for the case of a positive image and for the case of a negative image for an identical pattern. For such patterns, it is preferred to provide a black reduced image (4) in the case of a positive character or line-drawing image. In the case of a negative image, a white reduced image (5) is preferred. Accordingly, for patterns shown in FIG. 17(a), the x exception-pattern processing unit 610 outputs black (1) in the case of a positive image, and white (0) in the case of a negative image.

At that time, a signal indicating exception is output as the exception-pattern selection signal 262. The selector 240 shown in FIG. 10 selects the exception-pattern signal 261 from the exception-processing unit 260 to provide a reduced image (picture element x shown in FIG. 16).

Pattern (1) shown in FIG. 17(b) is an example wherein a black reduced image (2) is preferred in the case of a dither image from the viewpoint of preserving density, but a white reduced image (3) is preferred in the case of a nondither image, such as line drawing or the like. In any case shown in FIGS. 17(a) and 17(b), the reduced image C (FIG. 16) may be either white or black.

As described above, in the image reduction method according to the present embodiment, a reduced image by subsampling after filter processing is corrected using an exception-processing pattern. Furthermore, an exception pattern is selected by statistical processing, and adaptive reduction in accordance with the quality of a picture is performed.

Figure 18:
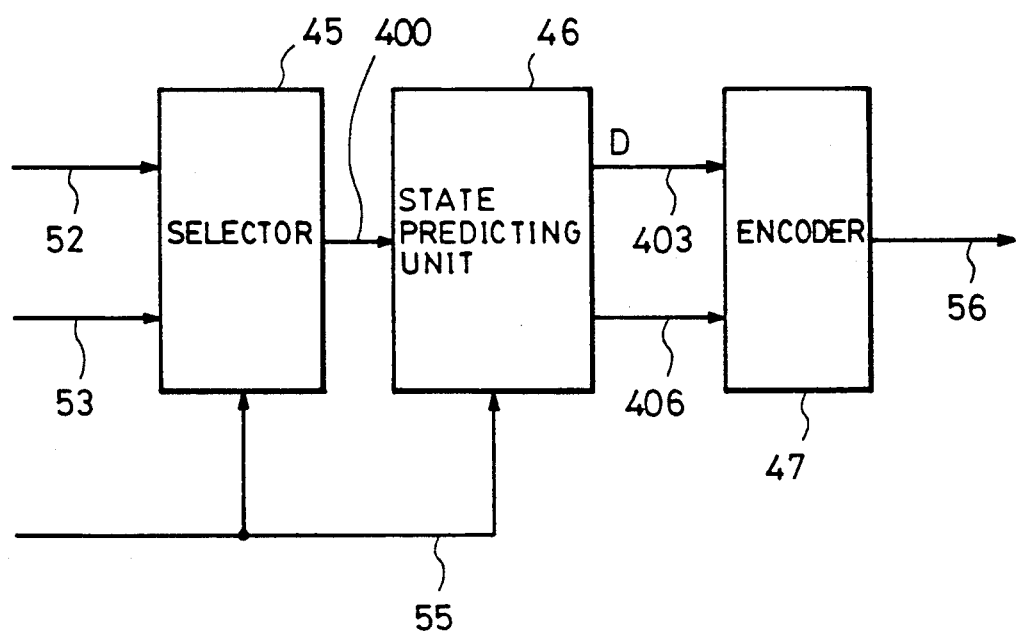
FIG. 18 is a block diagram of an encoding unit.

FIG. 18 shows the configuration of the encoding unit 44 (FIG. 9).

An original image or an icon image comprising an image reduced to $\frac{1}{2}^n$ are input from lines 52 and 53, respectively. The lines 52 and 53 are identical to the lines having the same reference numbers shown in FIG. 9. The selector 45 selects the kind of image to be encoded, that is, an original image or an icon image. Line 55 is for a signal for selecting the kind of image.

A state predicting unit 46 refers to picture elements surrounding a picture element to be encoded, and provides a predictive state for arithmetic encoding to be executed by the encoder 47.

Figure 19:
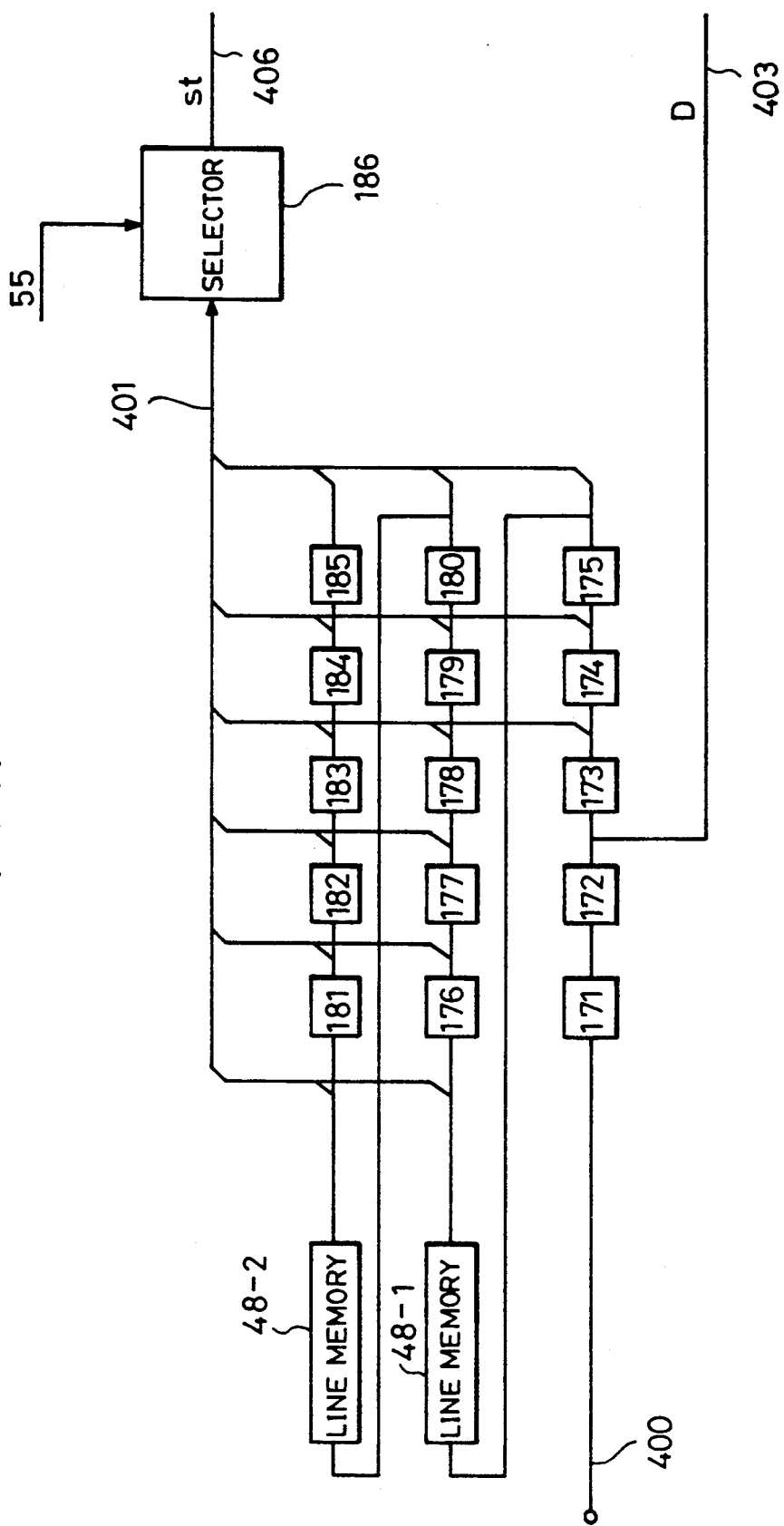
FIG. 19 is a block diagram of a state predicting unit.

FIG. 19 is a detailed block diagram of the state predicting unit 46. An image signal to be encoded is input from line 400. Line memories 48-1 and 48-2 store the states of picture elements on the preceding line and the line before the preceding line, respectively. Latches 171-185 store picture elements surrounding the picture element to be encoded.

The picture element to be encoded has the value stored in the latch 172. Values on line 401 represent output states from the line memory 48-1, 48-2 and 13 latches 173-185, that is, the states of picture elements surrounding the picture element to be encoded.

The information of the above-described 15 picture elements are input to a selector 186. The input information is selected by the signal for selecting the kind of image, and the selected information is output. That is, the selector 186 selects different reference picture elements for an original image and for an icon image. Examples of the reference picture elements are shown in FIGS. 20(a) and 20(b).

Figure 20:
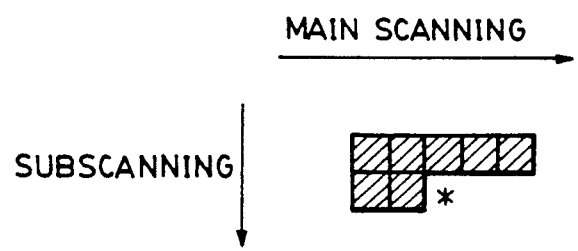
FIGS. 20(a) and 20(b) show examples of positions of reference picture elements.
Figure 20:
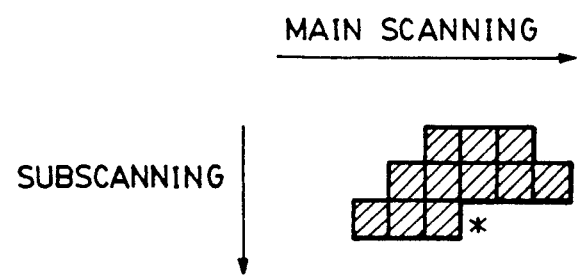

In the present embodiment, the reference picture elements for an icon image comprise surrounding 7 picture elements as shown in FIG. 20(a), and the reference picture elements for an original image comprise 11 picture elements, as shown in FIG. 20(b). That is, since an icon image is obtained by reducing an original image, an icon image has less correlation with surrounding picture elements than an original image. Hence, the number of reference picture elements is smaller for an icon image. The selection of reference picture elements is performed by the selector 186, which provides a state predicting signal St 406 indicating a surrounding state. The state predicting signal St 406 and a signal 403 for the picture element to be encoded are input to the encoder 47 (FIG. 10), which performs encoding according to these signals.

Figure 21:
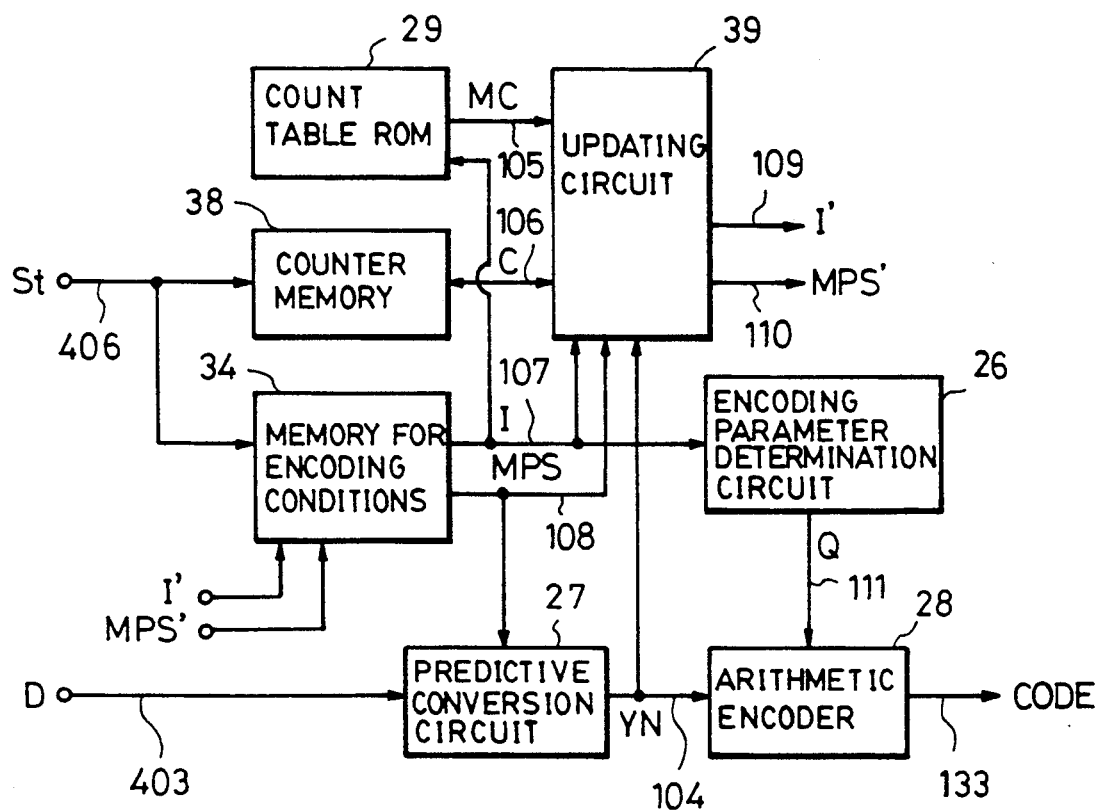
FIG. 21 is a block diagram of an encoder.

FIG. 21 is a block diagram of the encoder 47.

Before explaining FIG. 21, an explanation will be provided of arithmetic encoding used in the present embodiment.

As has been known, arithmetic encoding is a method to form codes by arithmetic calculation so that an input signal train is converted into codes represented by fractional binary numbers. This method is published, for example, in "Compression of Black/White Images with Arithmetic Coding", IEEE Trans. Com. COM-29, 6 (June, 1981) by Langdon, Rissanen et al, the disclosure of which is incorporated by reference. According to this literature, when an already-encoded input signal train is represented by S, the probability of appearance of a less powerful symbol (LPS) (i.e. one less likely to appear) is represented by q, the arithmetic register augend is represented by A(S), and the code register is represented by C(S), the following arithmetic calculation is performed for every input signal:

$$A(S1) = A(S) \times q \approx A(S) \times 2^{-Q} \quad (3)$$

$$A(S0) = <A(S) - A(S1)>_l \quad (4),$$

where $<>_l$ indicates truncation at the significant digit for l bits, = indicates approximate equality and Q is a positive integer, $$C(S0) = C(S) \quad (5)$$

$$C(S1) = C(S) + A(S0) \quad (6).$$

If encoded data comprise a more powerful symbol (i.e. one more likely to appear) (MPS, which is 0 in the above-described example), A(S0) and C(S0) are used for encoding the subsequent data. If encoded data comprise a less powerful symbol (LPS, which is 1 in the above-described example), A(S1) and C(S1) are used for encoding the subsequent data.

The new value A is multiplied by $2^s$ (S is an integer equal to or greater than 0) so as to be confined within the range of $0.5 \leq A \leq 1.0$. This processing corresponds to shifting the arithmetic register A S times in hardware. The same number of shifting operations is performed also for the code register C, and a signal as a result of the shifting operation becomes a code. The above-described operation is repeated to form codes.

As shown in expression (3), by approximating the probability q of appearance of an LPS with a power of 2 ($2^{-Q}$, where Q is a positive integer), a multiplication calculation replaces a shifting operation. In order to improve the approximation, q is approximated by, for example, a polynomial of powers of 2, as shown in expression (7). The worst point in efficiency is improved by this approximation.

$$q = 2^{-Q_1} + 2^{-Q_2} \quad (7).$$

In arithmetic encoding, since it is possible to change the value Q for every data to be encoded, a probability estimating portion can be separated from encoding.

As described above, in the present embodiment, a dynamic method is adopted wherein probability is estimated while performing encoding.

An explanation will now be provided of a block diagram of an encoder for performing the above-described arithmetic encoding, shown in FIG. 21.

The state signal St 406 from the state predicting unit 46 is input to a counter memory 38 and a memory 34 for encoding conditions.

The memory 34 for encoding conditions stores the more powerful symbol MPS 108 which is a symbol apt to appear, and an index I 107 indicating encoding conditions including the probability of appearance of the LPS in arithmetic encoding (to be described later) for every state represented by the state signal St 406. The MPS 108 is input to a predictive conversion circuit 27, which forms a YN signal 104 which becomes 0 when the picture-element signal D 403 coincides with the MPS 108. The YN signal 104 is input to an updating circuit 39, which increments the count of the corresponding state among counts stored in the counter memory 38 when the YN signal is 0. If the count value C 106 stored in the counter memory 38 coincides with a set value MC 105 from a count table ROM 29, the value is updated in a direction to increase the index I 107 (in a direction to decrease the probability of appearance of the LPS). The MPS is not inverted.

The count table ROM 29 supplies the updating circuit 39 with the number MC 105 of the MPS shown in Table 1 which is determined corresponding to the index I representing the probability q of appearance of the LPS.

If the MPS 108 does not coincide with the picture-element signal D 403, that is, if the YN signal from the predictive conversion circuit 27 is 1, the updating circuit 39 updates the value in a direction to decrease the index I 107 (in a direction to increase the probability q of appearance of the LPS). If an YN signal having the value 1 comes when the index is 1, processing to invert the MPS (0→1 or 1→0) is performed. Output I' 109 and MPS' 110 are the values of the index after an updating operation, and are restored in the memory 34 for encoding conditions.

An encoding parameter determination circuit 26 sets an encoding parameter Q 111 for arithmetic encoding to an arithmetic encoder 28 according to the value of the index I 107. The arithmetic encoder 28 performs arithmetic encoding of the YN signal 101 from the predictive conversion circuit 27 using the parameter Q 111.

By providing an initial value for the memory 34 for encoding conditions and not updating the MPS, static encoding can be easily performed.

Figure 25:
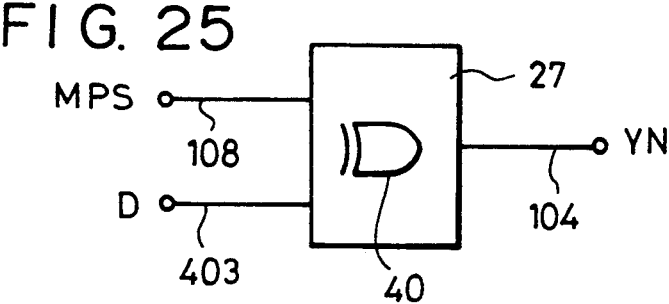
FIG. 25 is a block diagram of a predictive conversion circuit.

FIG. 25 is a block diagram of the predictive conversion circuit 27. The picture-element signal D 403 and the MPS 108 are input to an EX-OR circuit 40. The YN signal 104, which becomes 0 when the picture-element signal D 403 coincides with the MPS 108, and becomes 1 when the two signals do not coincide, is output in accordance with the logical expression shown in Table 2.

Figure 22:
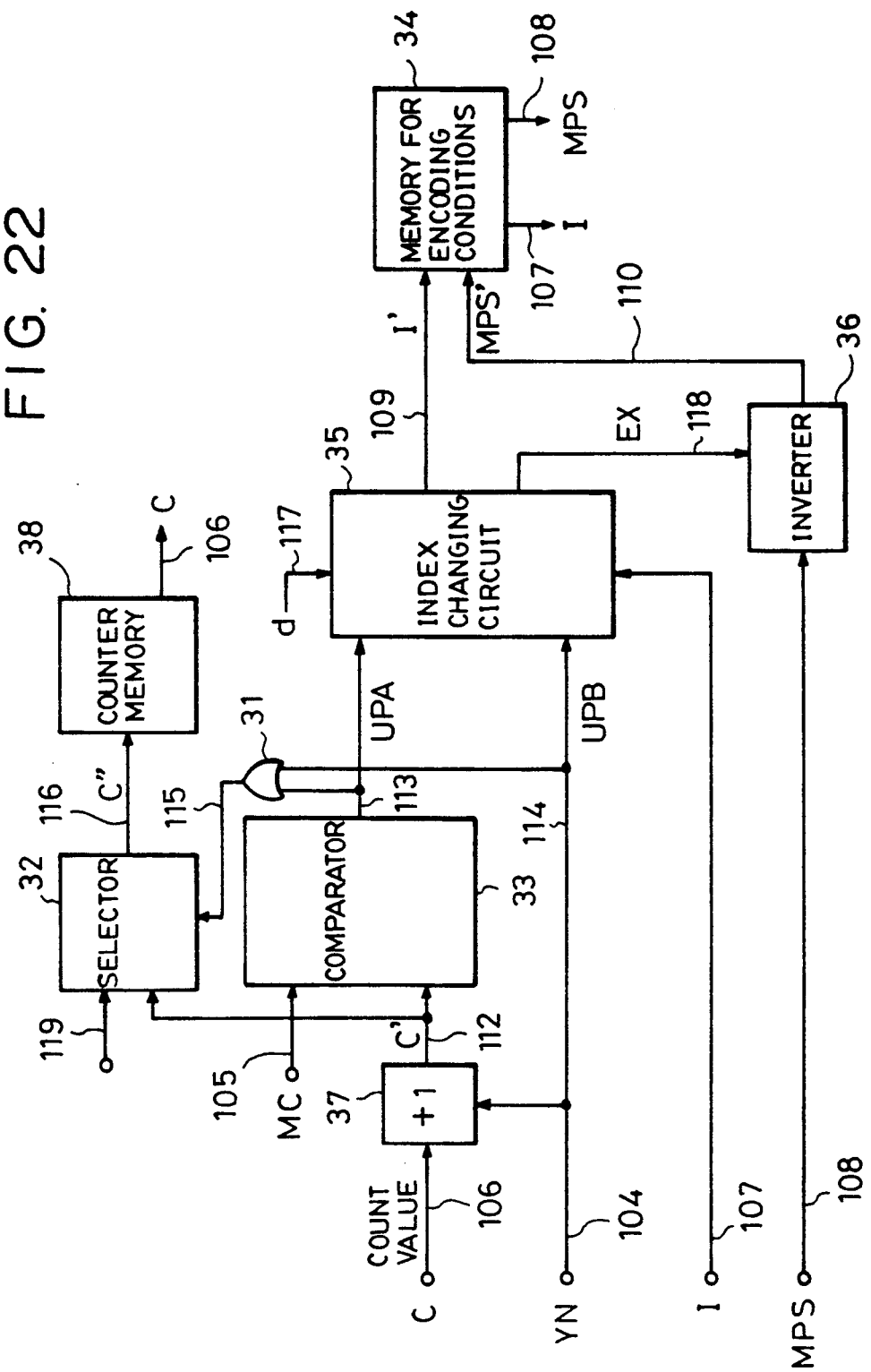
FIG. 22 is a block diagram of an updating circuit.

FIG. 22 is a block diagram of the updating circuit 39. When the YN signal 104 is 0, the count value C 106 from the counter memory 38 is incremented by +1 by an adder 37 to become signal C' 112. This value is compared with the MC 105 from the count table ROM 29 by a comparator 33. If the value C' coincides with the value MC, an updating signal UPA 113 is set. The YN signal 104 becomes an updating signal UPB 114. The signals UPA and UPB are input to an index changing circuit 35. Logical sum OR of the UPA and UPB is obtained by an OR circuit 31. An output signal 115 from the OR circuit 31 becomes a switching signal for a selector 32. The selector 32 selects 0 signal 119 in order to reset the value of the counter if the signal 115 is 1, and selects an output signal C' 112 from the adder 37 for other cases to output it as a counter updating signal C" 116 and store it in the counter memory 38.

A signal d 117 (d=1 in a standard case) to control the updating step of the index, the signals UPA 113 and UPB 114, and the current index I 107 output from the memory 34 for encoding conditions are input to the index changing circuit 35.

Table 3 shows a method to update the index by the index changing circuit 35 (in Table 3, a case wherein the updating step d=1 and d=2 is shown).

By referring this table with the input I, condition d, UPA and UPB, an updated index I' is determined. If I=1 and UPB=1, an EX signal 118 is set. If the EX signal is 1, an inverter 36 inverts the current symbol MPS 108 (0→1 or 1→0) to obtain an updated MPS' 110. If the Ex signal is 0, the MPS' is not changed. Updated I' 109 and MPS' 110 are stored in the memory 34 for encoding conditions to be used as the index I and MPS for the subsequent processing. The updating method shown in Table 3 may be configured by a table using a ROM or the like, or by logic using an adder-subtracter.

As described above, if MPSs equal to the number of MPSs determined in accordance with the value of the index I representing the probability q of appearance of the LPS approximated by the polynomial of powers of 2 are generated, condition d is added to the index I to decrease the probability q of appearance of the LSP used in arithmetic encoding. If LPSs are generated, condition d is subtracted from the index I to increase the probability q of appearance of the LPS used in arithmetic encoding. If LPSs are generated in a state wherein the index I representing that the probability q of appearance of the LSP is 0.5 is 1, MPSs are inverted.

Thus, by updating the index and MPS so as to be adaptive to an input image, arithmetic encoding having a high encoding efficiency can be achieved.

Figure 23:
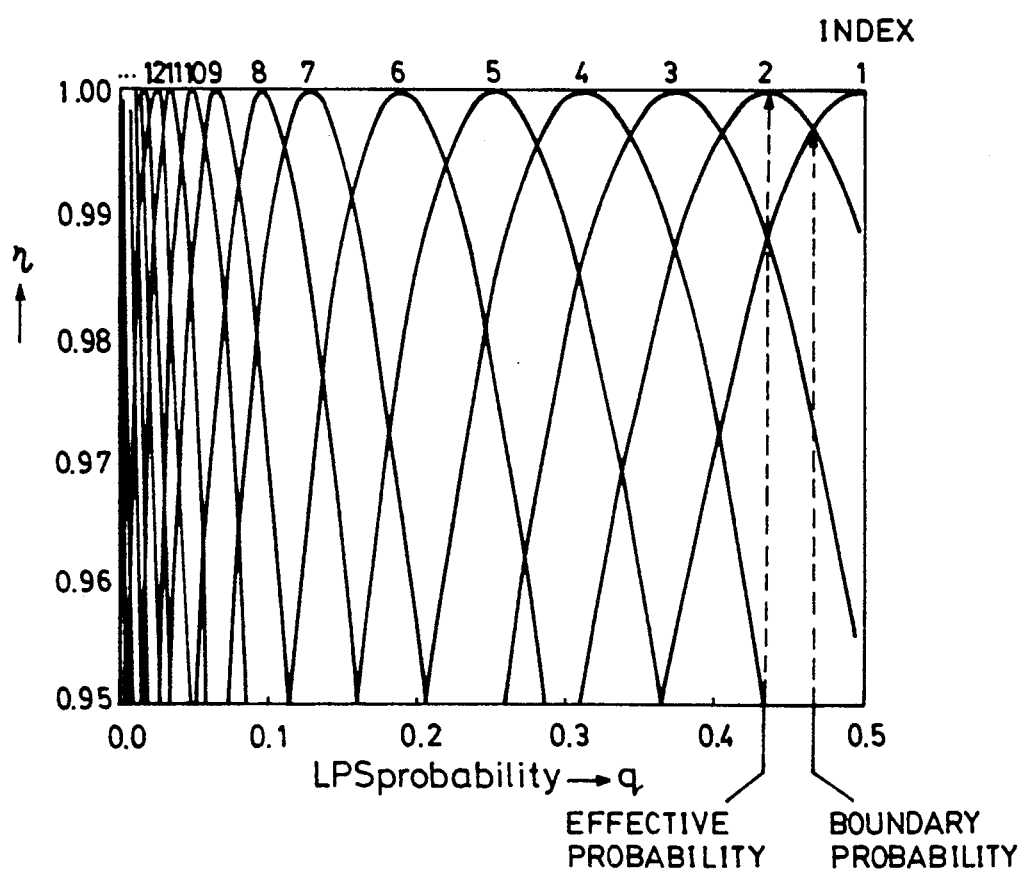
FIG. 23 shows encoding efficiency curves.

FIG. 23 shows encoding efficiency curves of arithmetic encoding used in the present embodiment. The value of the index I is hereinafter represented by i. These curves are expressed by expression (8), where q is the probability of appearance of the LPS, and $q_{ei}$ is the probability of approximation at the time of encoding. Numbers 1, 2, 3, - - - are sequentially allocated for the index I from an index having the largest value of the probability q of appearance of the LPS to indexes having smaller values.

$$\eta = \{-q\log_2 q - (1-q)\log_2(1-q)\}/\{-q\log_2 q_{ei} - (1-q)\log_2(1-q_{ei})\} \qquad (8),$$

where the numerator represents entropy, and $q_{ei}$ is a value expressed by expression (9).

$$q_{ei} = q_1 + q_2 \qquad (9).$$

The values $q_1$ and $q_2$ are approximated by polynomials of powers of 2, and are shown in Table 4. These values are, for example, expressed by expressions (10)–(12).

$$q_{e1}' = 2^{-1} \qquad (10)$$

$$q_{e2}' = 2^{-1} - 2^{-4} \qquad (11)$$

$$q_{e3}' = 2^{-2} + 2^{-3} \qquad (12).$$

The value $q_{ei}$ at the peak point where the efficiency $\eta$ becomes 1.0 in the above-described probability is hereinafter termed the effective probability. A point of intersection of two efficiency curves is termed boundary probability $q_{bi}$. It is apparent that higher efficiency is obtained by performing encoding using the adjacent effective probability bordering from the boundary probability $q_{bi}$.

In the present embodiment, the effective probability $q_{ei}$ shown in Table 4 is selected from the probability which can be approximated by two terms as shown in expression (7). Symbols $Q_1$, $Q_2$ and $Q_3$ shown in Table 4 are parameters $Q_c$ 111 to be transmitted to the arithmetic encoder 28. That is, symbols $Q_1$ and $Q_2$ are shift amounts to be provided for shift registers. The calculation of powers of 2 is performed by this shifting operation. Symbol $Q_3$ represents the second-term coefficient, and performs switching between + and −.

The value MC in Table 1 is determined in the following way.

That is, when the number of the LPSs is represented by $N_L$, and the number of the MPSs is represented by $N_M$, the probability of generation of the LPS is expressed by expression (13).

$$q = N_L/(N_M + N_L) \qquad (13).$$

From expression (13), $N_M$ is expressed by the following expression (14):

$$N_M = \lceil N_L(1/q - 1) \rceil \qquad (14),$$

where x indicates raising of the decimal point or less. By substituting $q_{bi}$ shown in FIG. 23 for q in expression (14), the number $N_{Mi}$ of more powerful symbols (MPSs) at that point can be calculated. Accordingly, the number MC can be calculated from expression (15).

$$MC_i = N_{Mi+1} - N_{Mi} \qquad (15).$$

The values of the MCs shown in Table 1 have been calculated from expressions (13), (14) and (15) with the condition of $N_L = 2$.

Thus, the number $N_{Mi}$ of the more powerful symbols MPS corresponding to each index I is obtained according to each value of the boundary probability $q_{bi}$ shown in FIG. 23, and the difference between the more powerful symbols $N_M$ of adjacent indexes is made the value MC for each index I.

The value MC and the number of generated more powerful symbols are compared with each other as described above. If the two values coincide with each other, it is determined that the state is a state suitable for encoding using the adjacent index I, and the index is changed. Thus, the index is changed with good timing according to the number of generations of more powerful symbols, and encoding using the most suitable index I can be adaptively achieved.

Figure 24:
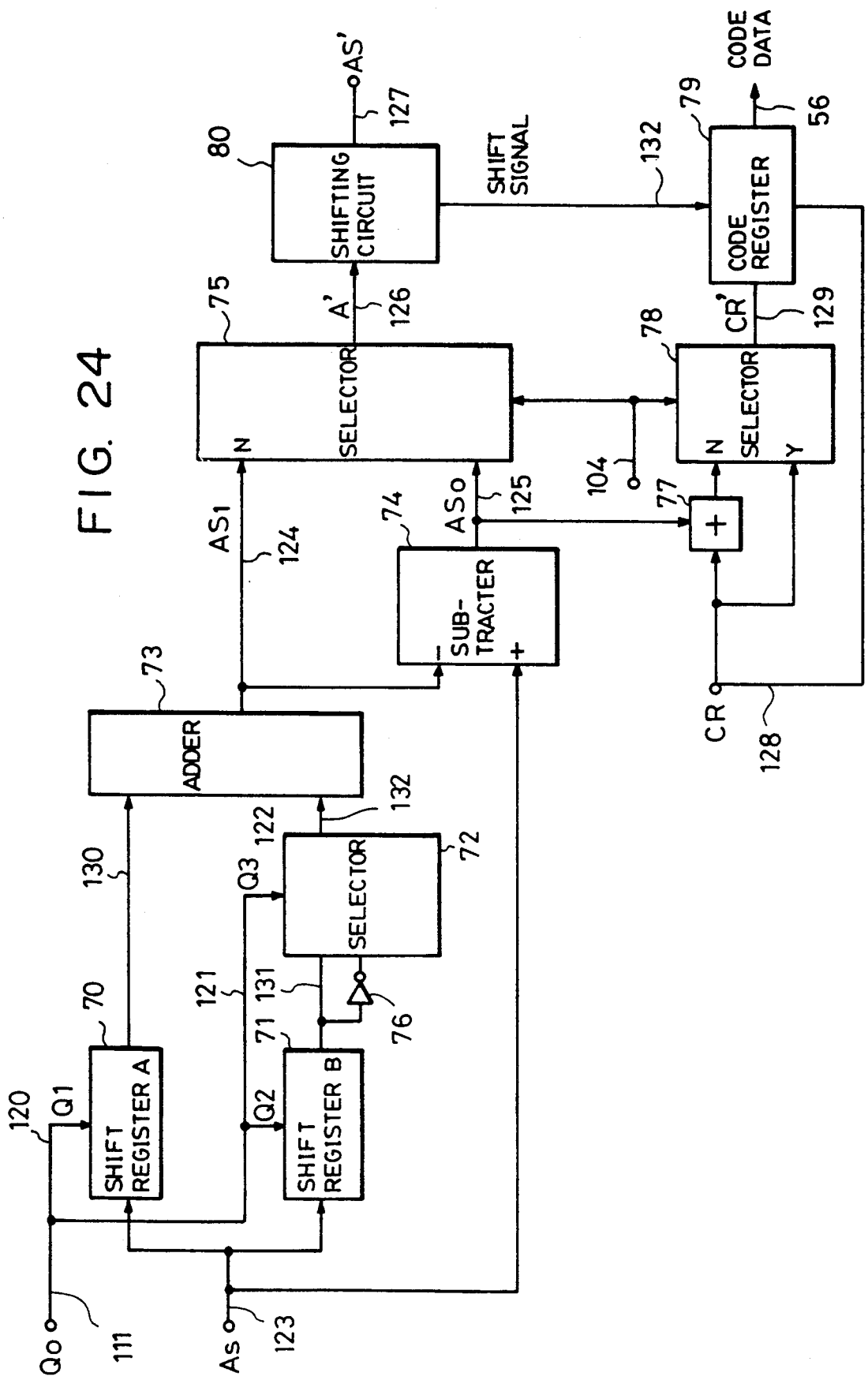
FIG. 24 is a block diagram of an arithmetic encoder.

FIG. 24 is a block diagram of the arithmetic encoder 28.

From among control signals $Q_c$ 111 (Table 4) determined by the encoding parameter determination circuit 26, $Q_1$, $Q_2$ and $Q_3$ are input to shift registers A 70 and B 71, and a selector 72, respectively. The signals $Q_1$ and $Q_2$ command the shift registers A and B how many bits a signal $A_s$ 123, serving as an augend signal, must be shifted to the right. The results of shift become output signals 130 and 131.

The complement of the signal 131 is provided by an inverter 76. The selector 72 selects the signal 131 or an output signal from the inverter 76 in accordance with the control signal $Q_3$ to provide an output signal 132. An adder 73 adds the signal 130 from the shift register A 70 and the signal 132 from the selector 72 to output a signal $A_{s1}$ 124. A subtracter 74 subtracts the signal $A_{s1}$ 124 from the signal $A_s$ 123 to provide a signal $A_{s0}$ 125. The selector 75 selects either the signal $A_{s0}$ 125 or the signal $A_{s1}$ 124 in accordance with the YN signal 104. That is, if the YN signal is 1, the signal $A_{s0}$ becomes signal A' 126. If the YN signal is 0, the signal $A_{s1}$ becomes signal A' 126. A shifting circuit 80 shifts the signal A' to the left until the most significant bit of the signal A' becomes 1 to provide a signal As' 127. A shift signal 132 corresponding to the frequency of shifting operations is input to a code register 79, which outputs bits whose number corresponds to the frequency of shifting operations sequentially from the most significant bit to provide code data 56.

The code data 56 are processed by a bit processing method (not shown) so that the bits continue within a finite number, and are transmitted to the side of the decoding device.

A signal CR 128 representing the contents of the code register 79 is added to the signal $A_{s0}$ 125 by an adder 77, and the resultant signal is input to a selector 78. The signal CR 128 to which the signal $A_{s0}$ 125 is not added is also input to the selector 78. A signal CR' 129 is output from the selector 78. The signal CR'=CR if the YN signal 104 is 1, and CR'=CR+$A_{s0}$ if the YN signal is 0. The above-described shifting processing is performed for the signal CR' by the code register 79.

As described above, the icon images and the original images are independently encoded by the encoding unit 44, and the encoded images are transmitted to the outside or stored in a storage unit in the order of the icon images and the original image.

Figure 26:
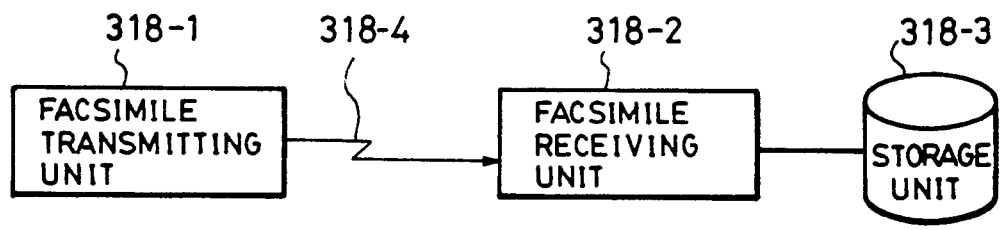
FIG. 26 illustrates an example wherein the embodiment is applied to facsimile communication.
Figure 27:
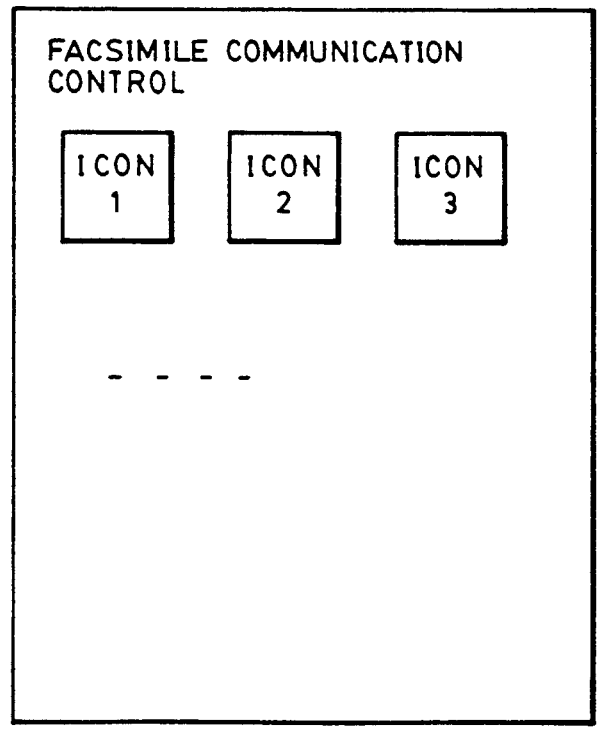
FIG. 27 shows an output example in facsimile communication.

An explanation will now be provided of a case wherein the present embodiments are used for the transmission of images in a facsimile or the like. FIG. 26 shows an example of such case. A facsimile transmitting unit 318-1 sequentially transmits the icon images and original images encoded in the present embodiments to a facsimile receiving unit 318-2 via communication network 318-4. The facsimile receiving unit 318-2 decodes the original images received after storing the previously received icon images in a storage unit 318-3, and outputs the decoded images on a medium, such as paper or the like. On the other hand, the stored icon images may be output in the form of a summary of received or transmitted images together with communication information comprising the time of transmission, address, the time of reception, the name of the transmitter and the like, as facsimile control information, as shown in FIG. 27.

According to the summary which has been output, the operator may select desired images, and print out only the selected images.

The icon images are very small in size, and have very small amount of data due to encoding. For example, if the icon has a size reduced to 1/32 in the vertical and horizontal directions, the amount of data is reduced to 1/1024 of that in the uncompressed state. If the icon is encoded, the amount of data becomes very small. Hence, a storage unit of a terminal at the reception side needs to have only a small capacity.

Figure 28:
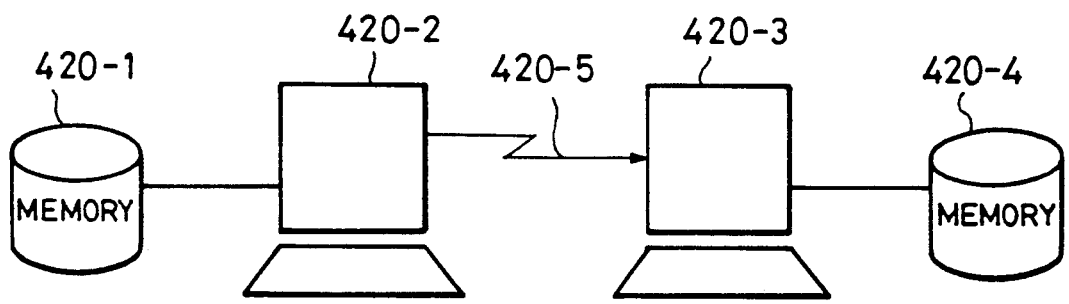
FIG. 28 illustrates an example wherein the embodiment is applied to soft copy communication.

FIG. 28 shows an example wherein the present embodiments are used for soft copy communication using a display unit as a medium, such as communication between computer terminals. In FIG. 28, images stored in a memory 420-1 of a terminal 420-2 are transmitted to a terminal 420-3, and the received images are stored in a memory 420-4. Icon images and original images encoded according to the method of the present embodiments are stored in the memory 420-1. First, the icon images are transmitted from the terminal 420-2 to the terminal 420-3 via line 420-5. Since the icons have a very small amount of data, it is possible to promptly receive the images and display the images on the display unit. At that time, magnified images using interpolation or the like may be simultaneously displayed.

In this case, if the received image is not a desired one, the terminal 420-3 may stop the transmission from the terminal 420-2 before receiving the original image. It is thereby possible to prevent the transmission of unnecessary data due to a wrong image or the like in image transmission.

Figure 29:
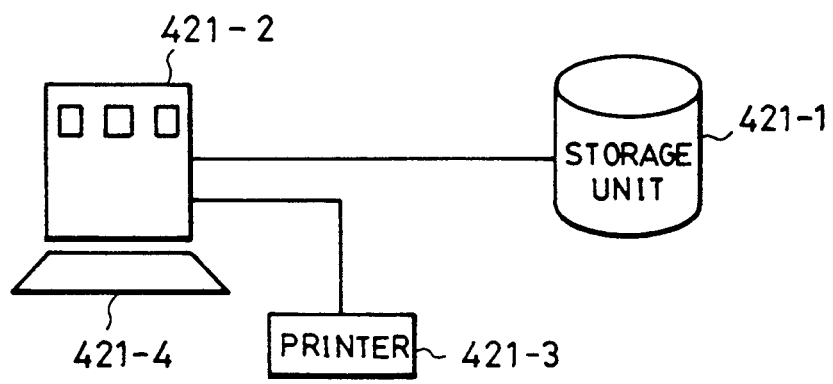
FIG. 29 illustrates an example wherein the embodiment is applied to image data base.
Figure 30:
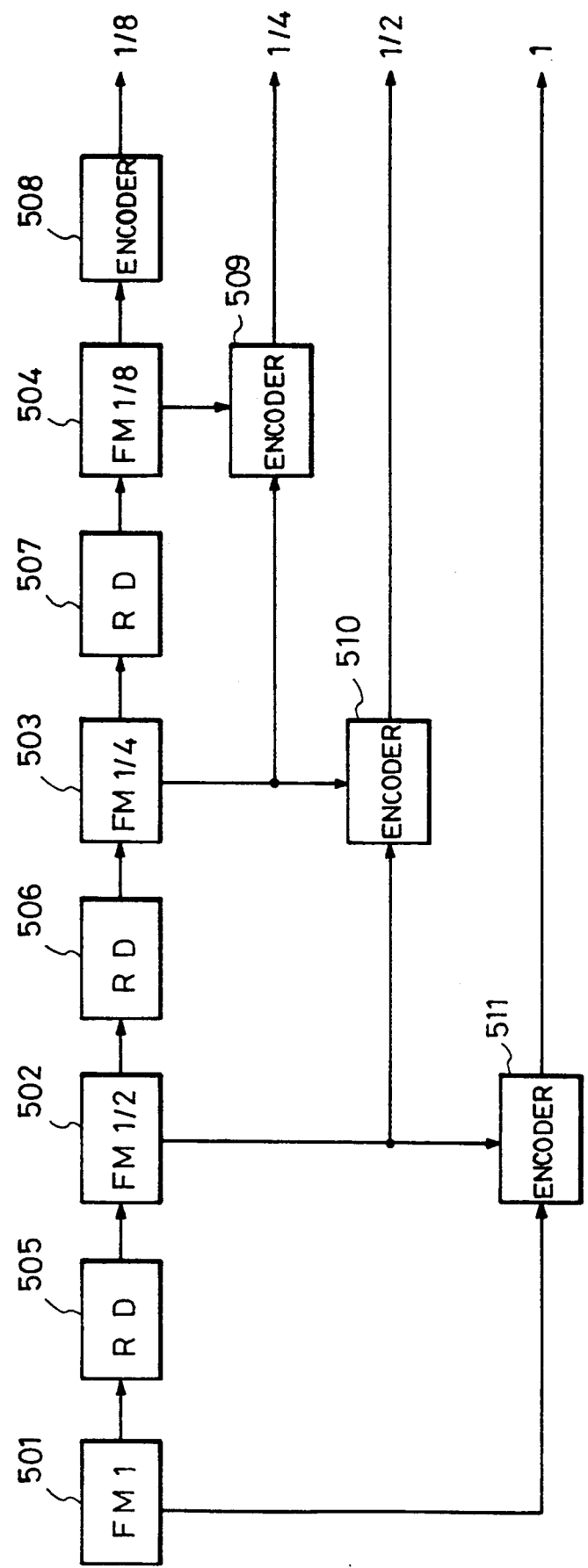
FIG. 30 illustrates a conventional example.

FIG. 29 shows an example wherein the present embodiments are applied to an image data base. A storage unit 421-1 stores each encoded data pair of an icon image and an original image encoded using the method of the present embodiments as image data base. In image retrieval, only icon images of respective images are read from the storage unit 421-1 in accordance with an indication from a keyboard 421-4, and are displayed on a display unit 421-2. Since the icon images are formed using the method of the present embodiments, they have only a small amount of data and an outline of their contents can be easily grasped. Since an original image of an icon image selected from an icon image directory displayed on the display unit 421-2 is encoded independently from the icon image, it is decoded at a high speed, and can be printed out using a printer 421-3 if necessary. Accordingly, it is possible to prevent loss in the image data base, and to decode an icon image and an original image independently from each other. When the image data base is present in a memory of another terminal as shown in FIG. 28, the advantages of the present example become more effective.

Although, in the present embodiments, both icon images and original images are encoded using the arithmetic encoding method, the same effects may be also obtained by other entropy encoding methods, for example, using known MH codes, MR codes, NMR codes or the like.

As explained above, according to the embodiments of the present invention, a reduced image having a desired size and an original image are encoded. It is thereby possible to sequentially encode and transmit images of two stages, that is, the reduced image and the original image, and to economize on the encoded data of unnecessary images of intermediate stages. As a result, frame memories for encoding and decoding images of intermediate stages are not needed. It is therefore possible to provide a small apparatus.

When the present embodiments are applied to facsimile communication, by storing reduced images, facsimile communication control and the like can be performed using the reduced images. When the present embodiments are applied to an image data base, by using reduced images for image retrieval, it is possible to perform a prompt retrieval operation. Furthermore, the present embodiments have the effect that an original image can be directly decoded without decoding unnecessary images of intermediate stages in a decoding operation, and it is therefore possible to reduce the amount of data and to improve decoding time.

The present invention is not limited to the above-described embodiment, but various changes and modifications may be made within the true spirit and scope of the appended claims.

TABLE 1

| I | MC |
|---|---|
| 1 | 2 |
| 2 | 1 |
| 3 | 1 |
| 4 | 1 |
| 5 | 2 |
| 6 | 4 |
| 7 | 5 |
| 8 | 8 |
| 9 | 11 |
| 10 | 15 |
| 11 | 22 |
| 12 | 30 |
| 13 | 43 |
| 14 | 61 |
| 15 | 87 |
| 16 | 120 |
| 17 | 174 |
| 18 | 241 |
| 19 | 348 |
| 20 | 483 |

TABLE 2

| D | MPS | YV |
|---|---|---|
| 0 | 0 | 0 |
| 0 | 1 | 1 |
| 1 | 0 | 1 |
| 1 | 1 | 0 |

TABLE 3

| | UP1 = UP2 = 0 | d = 1 | | | d = 2 | | |
|---|---|---|---|---|---|---|---|
| | | UP1 = 1 | UP2 = 1 | | UP1 = 1 | UP2 = 1 | |
| I | I' | I' | I' | EX | I' | I' | EX |
| 1 | 1 | 2 | 1 | 1 | 3 | 1 | 1 |
| 2 | 2 | 3 | 1 | 0 | — | — | — |
| 3 | 3 | 4 | 2 | 0 | 5 | 1 | 0 |
| 4 | 4 | 5 | 3 | 0 | — | — | — |
| 5 | 5 | 6 | 4 | 0 | 7 | 3 | 0 |
| 6 | 6 | 7 | 5 | 0 | — | — | — |
| 7 | 7 | 8 | 6 | 0 | 9 | 5 | 0 |
| 8 | 8 | 9 | 7 | 0 | — | — | — |
| 9 | 9 | 10 | 8 | 0 | 11 | 7 | 0 |
| 10 | 10 | 11 | 9 | 0 | — | — | — |
| 11 | 11 | 12 | 10 | 0 | 13 | 9 | 0 |
| 12 | 12 | 13 | 11 | 0 | — | — | — |
| 13 | 13 | 14 | 12 | 0 | 15 | 11 | 0 |
| 14 | 14 | 15 | 13 | 0 | — | — | — |
| 15 | 15 | 16 | 14 | 0 | 17 | 13 | 0 |
| 16 | 16 | 17 | 15 | 0 | — | — | — |
| 17 | 17 | 18 | 16 | 0 | 19 | 15 | 0 |
| 18 | 18 | 19 | 17 | 0 | — | — | — |
| 19 | 19 | 20 | 18 | 0 | 21 | 17 | 0 |
| 20 | 20 | 21 | 19 | 0 | — | — | — |
| 21 | 21 | 21 | 20 | 0 | 21 | 19 | 0 |

(—) indicates "don't care"

TABLE 4

| I | Effective probability $q_e$ | Coefficients | | Encoding parameters | | |
|---|---|---|---|---|---|---|
| | | $q_1$ | $q_2$ | $Q_1$ | $Q_2$ | $Q_3$ |
| 1 | 0.5000 | $2^{-2}$ | $2^{-2}$ | 2 | 2 | + |
| 2 | 0.4375 | $2^{-1}$ | $-2^{-4}$ | −1 | 4 | — |
| 3 | 0.3750 | $2^{-2}$ | $2^{-3}$ | 2 | 3 | + |
| 4 | 0.3125 | $2^{-2}$ | $2^{-4}$ | 2 | 4 | + |
| 5 | 0.2500 | $2^{-3}$ | $2^{-3}$ | 3 | 3 | + |
| 6 | 0.1875 | $2^{-3}$ | $2^{-4}$ | 3 | 4 | + |
| 7 | 0.1250 | $2^{-4}$ | $2^{-4}$ | 4 | 4 | + |
| 8 | 0.0938 | $2^{-4}$ | $2^{-5}$ | 4 | 5 | + |
| 9 | 0.0625 | $2^{-5}$ | $2^{-5}$ | 5 | 5 | + |
| 10 | 0.0469 | $2^{-5}$ | $2^{-6}$ | 5 | 6 | + |
| 11 | 0.0313 | $2^{-6}$ | $2^{-6}$ | 6 | 6 | + |
| 12 | 0.0234 | $2^{-6}$ | $2^{-7}$ | 6 | 7 | + |
| 13 | 0.0156 | $2^{-7}$ | $2^{-7}$ | 7 | 7 | + |
| 14 | 0.0117 | $2^{-7}$ | $2^{-8}$ | 7 | 8 | + |
| 15 | 0.0078 | $2^{-8}$ | $2^{-8}$ | 8 | 8 | + |
| 16 | 0.0059 | $2^{-8}$ | $2^{-9}$ | 8 | 9 | + |
| 17 | 0.0039 | $2^{-9}$ | $2^{-9}$ | 9 | 9 | + |
| 18 | 0.0029 | $2^{-9}$ | $2^{-10}$ | 9 | 10 | + |
| 19 | 0.0020 | $2^{-10}$ | $2^{-10}$ | 10 | 10 | + |
| 20 | 0.0015 | $2^{-10}$ | $2^{-11}$ | 10 | 11 | + |
| 21 | 0.0010 | $2^{-11}$ | $2^{-11}$ | 11 | 11 | + |

What is claimed is:

1. An image processing method comprising the steps of:

progressively encoding input image data to provide encoded image data having respective resolutions;

storing a plurality of low-resolution image data among encoded image data, each of which corresponds to one of a plurality of different original images; and forming a plurality of low-resolution images, each of which corresponds to one of the plurality of original images on one picture surface, so as to be seen at one time, according to the stored plurality of low-resolution image data.

2. A method according to claim 1, wherein said encoding is performed by repeatedly reducing the input image data.

3. A method according to claim 2, wherein said encoding is performed separately for the input image data and reduced image data.

4. A method according to claim 1, wherein additional information is stored together with the low-resolution image data in said storing step.

5. A method according to claim 1, wherein said image formation is performed on a display unit.

6. A method according to claim 1, wherein said image formation is performed on paper.

7. An image processing apparatus comprising:

input means for inputting image data;

encoding means for progressively encoding said image data to provide encoded data having respective resolutions;

memory means for storing a plurality of low-resolution image data among encoded image data, each of which corresponds to one of a plurality of different original image; and image forming means for forming a plurality of low-resolution images, each of which corresponds to one of the plurality of original images on one picture surface, so as to be seen at one time, according to the plurality of low-resolution image data.

8. An apparatus according to claim 7, wherein said input means comprises an image input device for photoelectrically reading and inputting an image of an original.

9. An apparatus according to claim 7, wherein said encoding means comprises a plurality of encoders for encoding image data having different resolutions.

10. An apparatus according to claim 7, wherein said memory means stores a plurality of low-resolution encoded image data corresponding to a plurality of respective images.

11. An apparatus according to claim 7, wherein said image forming means forms images on a display unit.

12. An apparatus according to claim 7, wherein said image forming means forms images on paper.

13. An image processing method comprising the steps of:
reducing an input image represented by input image data to generate a reduced image represented by reduced image data;
storing the reduced image data in a memory;
repeating said reducing step and said storing step; and
encoding the first input image data and the last reduced image data, without encoding intermediate reduced image data.

14. A method according to claim 13, wherein said input image data and said reduced image data are independently encoded.

15. A method according to claim 13, wherein said input image data and said reduced image data are encoded by entropy encoding.

16. A method according to claim 13, further comprising the step of storing the encoded input image data and reduced image data.

17. A method according to claim 13, further comprising the step of decoding the encoded input image data and reduced image data to form images.

18. A method according to claim 13, further comprising the step of transmitting the encoded input image data and reduced image data.

19. An image data communication apparatus comprising:
input means for inputting image data;
reduction means for reducing the image data input by said input means;
memory means for storing the image data input by said input means;
transmitting means for transmitting the image data stored in said memory means; and
image forming means for forming an image in accordance with the reduced image data reduced by said reduction means and with information relating to the transmission of the image data on one sheet, so as to be seen at one time.

20. An apparatus according to claim 19, wherein said input means comprises reading means for sequentially reading images of an original comprising a plurality of sheets.

21. An apparatus according to claim 19, further comprising encoding means for encoding the image data stored in said memory means.

22. An apparatus according to claim 19, wherein said information includes address information and a time of transmission.

23. An apparatus according to claim 19, wherein said image forming means forms a plurality of reduced images within one picture surface.

24. An image data communication apparatus comprising:
receiving means for receiving image data;
memory means for storing the image data received by said receiving means; and
image forming means for forming a reduced image in accordance with the image data stored in said memory means and an image in accordance with information relating to the communication of the image data on one sheet, so as to be seen at one time.

25. An apparatus according to claim 24, wherein said receiving means receives progressively encoded image data.

26. An apparatus according to claim 24, wherein said information includes a time of reception, and information relating to a transmitter.

27. An apparatus according to claim 24, wherein said image forming means forms a plurality of reduced images.

28. An apparatus according to claim 27, further comprising selection means for selecting at least one of said reduced images, and wherein said image forming means forms an image using image data stored in said memory means corresponding to the selected reduced image.

29. An image processing method comprising the steps of:
receiving encoded image data having respective resolutions;
storing a plurality of low-resolution image data among the encoded image data, each of which corresponds to one of a plurality of different original images; and
forming a plurality of low-resolution images, each of which corresponds to one of the plurality of original images on one picture surface, so as to be seen at one time, according to the stored plurality of low-resolution image data.

30. A method according to claim 29, wherein said encoded image data is encoded by repeatedly reducing the input image data.

31. A method according to claim 30, wherein said encoded image data is encoded separately for the input image data and reduced image data.

32. A method according to claim 29, wherein additional information is stored together with the low-resolution image data in said storing step.

33. A method according to claim 29, wherein said image formation is performed on a display unit.

34. A method according to claim 29, wherein said image formation is performed on paper.

35. An image processing apparatus comprising:
receiving means for receiving encoded image data having respective resolutions;
memory means for storing a plurality of low-resolution image data among the encoded image data, each of which corresponds to one of a plurality of different original images; and image forming means for forming a plurality of low-resolution images, each of which corresponds to one of the plurality of original images on one picture surface, so as to be seen at one time, according to the stored plurality of low-resolution image data.

36. An apparatus according to claim 35, wherein said image forming means forms images on a display unit.

37. An apparatus according to claim 35, wherein said image forming means forms images on paper. p

* * * * *

UNITED STATES PATENT AND TRADEMARK OFFICE
CERTIFICATE OF CORRECTION

PATENT NO. : 5,267,052
DATED : November 30, 1993
INVENTOR(S) : YUUICHI BANNAI, ET AL.

It is certified that error appears in the above-identified patent and that said Letters Patent is hereby corrected as shown below:

ON TITLE PAGE

In [54] Title, "PROGESSIVELY" should read --PROGRESSIVELY--.

In [56] References Cited, after U.S. PATENT DOCUMENTS, insert:

-- FOREIGN PATENT DOCUMENTS

| | | |
|---|---|---|
| 0051294 | 5/1982 | European Pat. Off. |
| 0122094 | 10/1984 | European Pat. Off. |
| 2216746 | 10/1989 | United Kingdom --. |

In [56] References Cited, under OTHER PUBLICATIONS, insert:

--NHK Laboratories Note, No. 328, Feb. 1986, Inoue et al. "Image Filing System Capable of Quick Retrieval".--.

COLUMN 2

Line 60, "polular" should read --popular--.

COLUMN 11

Line 55, "x" should be deleted.

COLUMN 21

Line 4, "image;" should read --images;--.

UNITED STATES PATENT AND TRADEMARK OFFICE
CERTIFICATE OF CORRECTION

PATENT NO. : 5,267,052
DATED : November 30, 1993
INVENTOR(S) : YUUICHI BANNAI, ET AL.

Page 2 of 2

It is certified that error appears in the above-identified patent and that said Letters Patent is hereby corrected as shown below:

COLUMN 24

Line 6, "p" should be deleted.

Signed and Sealed this

Twentieth Day of September, 1994

*Attest:*

BRUCE LEHMAN

*Attesting Officer*    *Commissioner of Patents and Trademarks*